United States Patent
Fukuda et al.

(10) Patent No.: US 12,331,490 B2
(45) Date of Patent: Jun. 17, 2025

(54) WORKING VEHICLE AND ATTACHMENT USAGE SYSTEM

(71) Applicant: KUBOTA CORPORATION, Osaka (JP)

(72) Inventors: Yuji Fukuda, Sakai (JP); Ryota Hamamoto, Sakai (JP)

(73) Assignee: KUBOTA CORPORATIN, Osaka (JP)

( * ) Notice: Subject to any disclaimer, the term of this patent is extended or adjusted under 35 U.S.C. 154(b) by 173 days.

(21) Appl. No.: 18/243,204

(22) Filed: Sep. 7, 2023

(65) Prior Publication Data
US 2025/0084618 A1    Mar. 13, 2025

(51) Int. Cl.
*E02F 9/26* (2006.01)
*E02F 3/43* (2006.01)
*G01S 1/04* (2006.01)

(52) U.S. Cl.
CPC .............. *E02F 9/264* (2013.01); *E02F 3/431* (2013.01); *G01S 1/0428* (2019.08); *G01S 1/047* (2013.01)

(58) Field of Classification Search
None
See application file for complete search history.

(56) References Cited

U.S. PATENT DOCUMENTS

| | | | | |
|---|---|---|---|---|
| 6,061,617 | A * | 5/2000 | Berger | E02F 3/438 701/34.2 |
| 2005/0179549 | A1* | 8/2005 | Ota | H01L 21/67294 340/572.1 |
| 2005/0283295 | A1* | 12/2005 | Normann | E02F 9/26 701/50 |
| 2013/0080644 | A1* | 3/2013 | Kimura | H04W 8/245 709/227 |
| 2017/0298992 | A1* | 10/2017 | Koshi | F16C 41/008 |
| 2018/0284781 | A1* | 10/2018 | Cohen | G05D 1/0225 |
| 2019/0065931 | A1* | 2/2019 | Ward | B60D 1/62 |
| 2019/0130349 | A1* | 5/2019 | Ferguson | G06Q 10/08355 |
| 2019/0200224 | A1* | 6/2019 | Kinugawa | H04W 12/48 |
| 2021/0132577 | A1* | 5/2021 | Matzelle | H04Q 9/00 |
| 2022/0196042 | A1* | 6/2022 | Froemming | E02F 9/2228 |
| 2022/0412040 | A1* | 12/2022 | Zitterbart | E02F 3/431 |
| 2024/0337092 | A1* | 10/2024 | Hamamoto | F15B 19/00 |

* cited by examiner

*Primary Examiner* — Daniel L Greene
(74) *Attorney, Agent, or Firm* — Keating & Bennett, LLP

(57) ABSTRACT

A controller is configured or programmed to cause a first memory to store, for a period of time, piece(s) of identification information included in wireless signal(s) transmitted from transmitter(s) in or on attachment(s) and received by a receiver in or on a working vehicle, when one of the attachment(s) is attached to a hitch, select a piece of identification information of the attachment attached to the hitch from the piece(s) of identification information stored in the first memory and start a predetermined process according to the selected piece of identification information, and even if the receiver receives wireless signal(s) before the attachment is allowed to be detached from the hitch, continue to perform the predetermined process without performing selection of a piece of identification information again.

20 Claims, 22 Drawing Sheets

Fig.3

| Attachment ID | Display data |
|---|---|
| ATT0001 | Name<br>Specifications<br>Icon etc. |
| ATT0002 | Name<br>Specifications<br>Icon etc. |
| ATT0003 | Name<br>Specifications<br>Icon etc. |
| ⋮ | ⋮ |

Fig.4

| Attachment ID | Control data Amount of supply of hydraulic fluid |
|---|---|
| ATT0001 | None |
| ATT0002 | Small |
| ATT0003 | Large |
| ⋮ | ⋮ |

Fig. 9

| Name | Attachment ID | Specifications |
|---|---|---|
| Bucket | ATT0001 | Excavation, Large, Total length, Total width, etc. |
| Spreader | ATT0002 | Spreading, Total length, Total width, etc. |
| Skid cutter | ATT0003 | Mowing, Small, Total length, Total width, etc. |
| Pallet fork | ATT00xy | Cargo handling, Total length, Total width, etc. |
| Bucket | ATT00xx | Excavation, Small, Total length, Total width, etc. |
| ... | ... | ... |

L1

<Securing-of-attachment recognizing process>

WORKING VEHICLE AND ATTACHMENT USAGE SYSTEM

BACKGROUND OF THE INVENTION

1. Field of the Invention

The present invention relates to a technique to use an attachment on a working vehicle.

2. Description of the Related Art

For example, the specification of U.S. Patent Application Publication No. 2022/412040 discloses a system to automatically determine the positions of attachments in the vicinity of a working vehicle. The system is such that a first communication unit (tool module) including a first acceleration sensor is provided on an attachment such as a bucket, a quick changer configured to quickly and simply attach and detach the attachment thereto and therefrom is provided at the distal end of the boom of the working vehicle (excavator), a second communication unit (receiving module) including a second acceleration sensor is provided at the quick changer, and the working vehicle is provided with an identification module and a controller.

The first communication unit transmits, to the second communication unit via a near field communication such as RFID or Bluetooth (registered trademark) Low Energy, a first acceleration signal relating to the instantaneous acceleration of the attachment detected by the first acceleration sensor and an identifying signal of the attachment. The second communication unit transmits, to the identification module, the first acceleration signal and the identifying signal received from the first communication unit and the second acceleration signal relating to the instantaneous acceleration of the quick changer detected by the second acceleration sensor. The identification module identifies the attachment attached to the quick changer based on the comparison (e.g., difference) between the first acceleration signal and the second acceleration signal received from the second communication unit, and transmits the identification information of the attachment to the controller. The controller performs an appropriate operation (work operation) of the working vehicle based on the received identifying signal.

However, with the known system as described above, the identification module determines the position of an attachment corresponding to a first acceleration signal every time the first acceleration signal from the first communication unit is received by the second communication unit, regardless of whether the attachment is attached to the working vehicle or not. Therefore, the processing load on the identification module increases needlessly, causing inefficiency. Furthermore, also while the attachment is attached to the working vehicle, the identification module repeatedly identifies the attached attachment and, every time the identification module identifies the attached attachment, the controller adjusts the operation of the working vehicle appropriately based on the identifying signal of the attachment. This may hinder the smooth operation and may cause inefficiency.

SUMMARY OF THE INVENTION

Preferred embodiments of the present invention make it possible to efficiently use an attachment on a working vehicle.

A working vehicle according to a preferred embodiment of the present invention includes a hitch to attach and detach an attachment thereto and therefrom, a receiver to receive one or more wireless signals which are transmitted periodically from one or more transmitters in or on one or more of the attachments, which include respective one or more pieces of identification information of the one or more attachments, and which are compliant with a near field communication standard, and a controller. An attachment usage system according to a preferred embodiment of the present invention includes the hitch, the transmitter, the receiver, and the controller. The controller is configured or programmed to cause a first memory to store, for a period of time, the one or more pieces of identification information included in the one or more wireless signals received by the receiver, when one of the one or more attachments is attached to the hitch, select a piece of identification information of the attachment attached to the hitch from the one or more pieces of identification information stored in the first memory and start a predetermined process according to the selected piece of identification information, and even if the receiver receives one or more wireless signals from one or more transmitters before the attachment is allowed to be detached from the hitch, continue to perform the predetermined process without performing selection of a piece of identification information again.

The working vehicle may further include a user interface to output information indicating that the attachment corresponding to the selected piece of identification information selected by the controller is attached. The controller may be configured or programmed to cause a user interface provided somewhere other than the working vehicle to output information indicating that the attachment corresponding to the selected piece of identification information is attached.

The working vehicle may further include a second memory to store one or more pieces of control data corresponding to respective one or more pieces of identification information of one or more attachments attachable to the hitch. The controller may be configured or programmed to read, from the second memory, a piece of control data which is one of the one or more pieces of control data that corresponds to the selected piece of identification information, and start controlling power output to the attachment attached to the hitch based on the read piece of control data.

The controller may be configured or programmed to, if no identification information is stored in the first memory when the attachment is attached to the hitch, start the predetermined process according to a piece of identification information included in one or more wireless signals received by the receiver within a predetermined period of time from when the attachment is attached to the hitch.

The controller may be configured or programmed to, upon determining that one or more of the one or more wireless signals received by the receiver within the predetermined period of time have a received signal strength greater than a first predetermined value and/or that one or more of the one or more wireless signals include vibration information indicating that corresponding one or more of the one or more attachments are vibrating, start the predetermined process according to a piece of identification information included in the one or more of the one or more wireless signals.

The controller may be configured or programmed to allow a user interface to receive a piece of attachment information relating to the attachment attached to the hitch if the receiver does not receive any wireless signals from any transmitters within the predetermined period of time, and start the predetermined process according to the piece of attachment information received via the user interface.

The controller may be configured or programmed to cause the user interface to display an attachment list including one or more pieces of attachment information relating to respective one or more attachments attachable to the hitch if the receiver does not receive any wireless signals from any transmitters within the predetermined period of time, and start the predetermined process according to one of the one or more pieces of attachment information selected from the attachment list via the user interface.

The working vehicle may further include a first operation switch to be operated to attach each of the one or more attachments to the hitch, and a second operation switch to be operated to allow each of the one or more attachments to be detached from the hitch. The controller may be configured or programmed to determine whether or not one of the one or more attachments is attached to the hitch based on an operation state of the first operation switch, and determine whether or not the one of the one or more attachments is allowed to be detached from the hitch based on an operation state of the second operation switch.

The controller may be configured or programmed to, upon determining that one or more of the one or more wireless signals received by the receiver have a received signal strength greater than a first predetermined value and/or that one or more of the one or more wireless signals include vibration information indicating that corresponding one or more of the one or more attachments are vibrating, cause the first memory to store, for the period of time, one or more of the one or more pieces of identification information that are included in the one or more of the one or more wireless signals.

The controller may be configured or programmed to, if one of the one or more wireless signals received by the receiver includes a vibration indicator indicating a magnitude of vibration of a corresponding one of the one or more attachments and the vibration indicator is greater than a second predetermined value, determine that the one of the one or more wireless signals received by the receiver includes the vibration information.

The controller may be configured or programmed to cause the first memory to store, for the period of time, at least one of (i) one or more received signal strengths of the one or more wireless signals received by the receiver or (ii) one or more pieces of vibration information relating to one or more vibration states of the one or more attachments included in the one or more wireless signals such that the at least one of (i) the one or more received signal strengths or (ii) the one or more pieces of vibration information is associated with the one or more pieces of identification information included in the one or more wireless signals, and upon attachment of the attachment to the hitch, select the piece of identification information of the attachment attached to the hitch from the one or more pieces of identification information stored in the first memory based on a predetermined condition relating to at least one of received signal strength or vibration information, and start the predetermined process according to the selected piece of identification information.

The controller may be configured or programmed to cause the first memory to store, for the period of time, one or more received signal strengths of the one or more wireless signals received by the receiver such that the one or more received signal strengths are associated with the one or more pieces of identification information included in the one or more wireless signals. The predetermined condition may include a condition that one of the one or more pieces of identification information that corresponds to a highest one of the one or more received signal strengths is to be selected.

The working vehicle may be selectively operable in an automatic selection mode in which the controller selects the piece of identification information of the attachment attached to the hitch from the one or more pieces of identification information stored in the first memory and starts the predetermined process according to the selected piece of identification information, or a manual selection mode in which the controller starts the predetermined process according to information relating to the attachment inputted via a user interface.

The controller may be configured or programmed to cause the user interface to display an attachment list including one or more pieces of attachment information relating to respective one or more attachments attachable to the hitch upon the working vehicle entering the manual selection mode and the attachment being attached to the hitch, and start the predetermined process according to one of the one or more pieces of attachment information selected from the attachment list via the user interface.

In an aspect of a preferred embodiment of the present invention, the one or more transmitters may include one or more beacon transmitters to transmit one or more advertisement signals including the one or more pieces of identification information of the one or more attachments in or on which the one or more transmitters are provided. The receiver may include a beacon scanner to receive the one or more advertisement signals.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 3 is a diagram showing an example of the relationship between attachment IDs and their corresponding pieces of display data.

FIG. 4 is a diagram showing an example of the relationship between attachment IDs and their corresponding pieces of control data.

FIG. 9 is a screen showing an example of an attachment list.

DETAILED DESCRIPTION OF THE PREFERRED EMBODIMENTS

Figure 1:
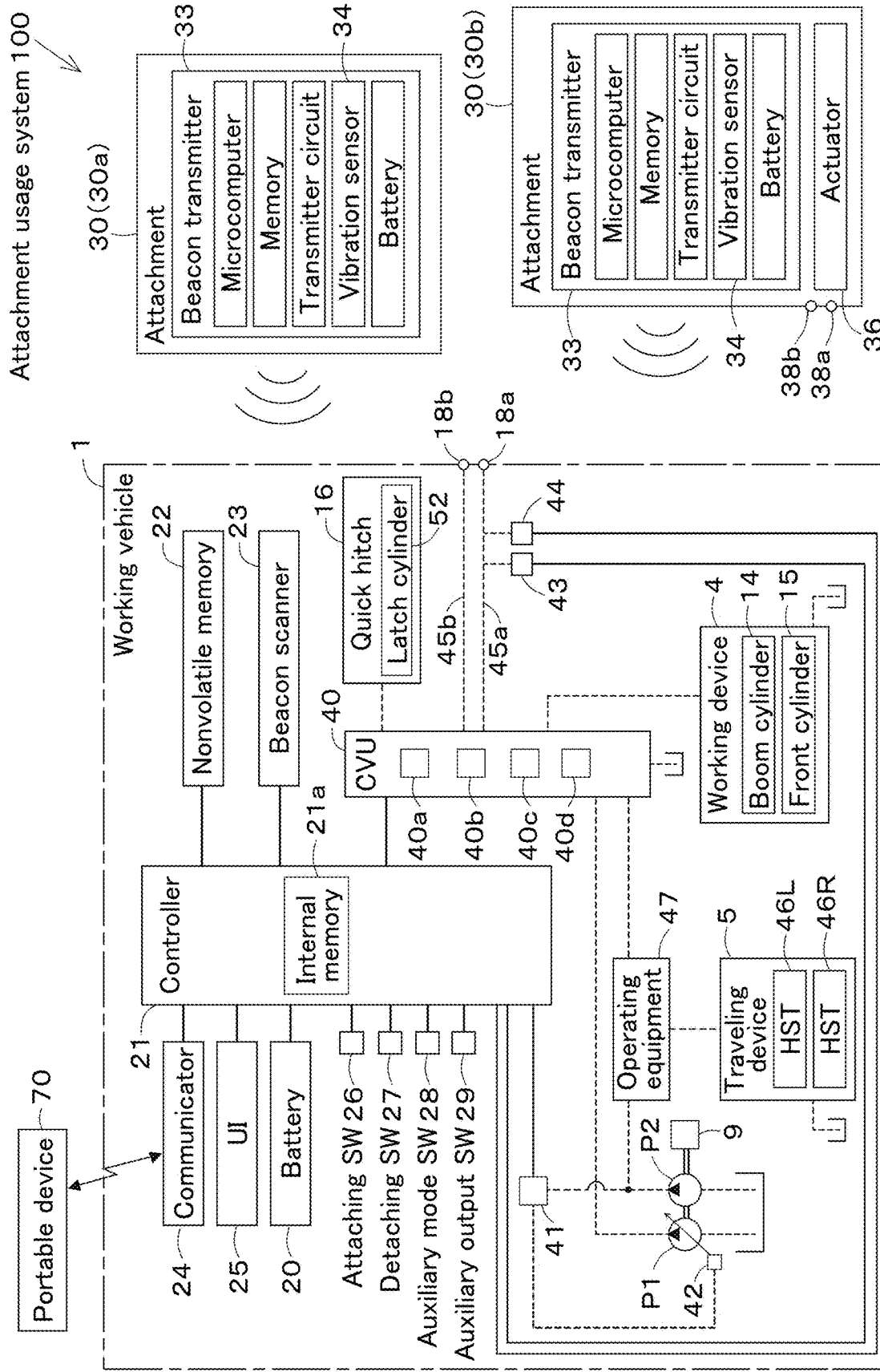
FIG. 1 is a block diagram of an attachment usage system and a working vehicle.

The preferred embodiments will now be described with reference to the accompanying drawings, wherein like reference numerals designate corresponding or identical elements throughout the various drawings. The drawings are to be viewed in an orientation in which the reference numerals are viewed correctly.

The following description discusses preferred embodiments of the present invention with reference to the drawings as needed.

Figure 19:
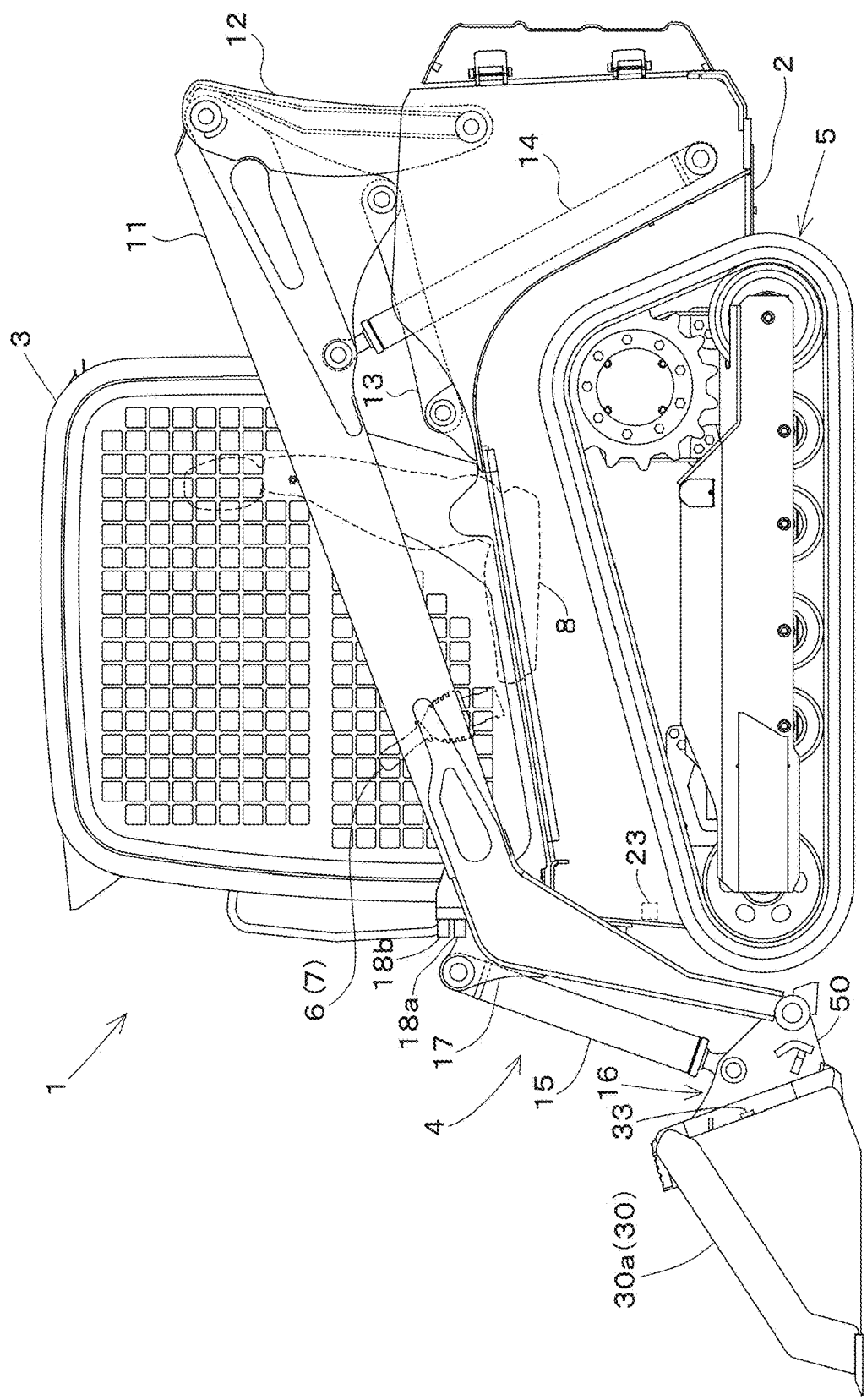
FIG. 19 is a side view of a working vehicle.

FIG. 19 is a side view of a working vehicle 1 according to the present preferred embodiment. In the present preferred embodiment, a compact track loader is discussed as an example of the working vehicle 1. Note, however, that the working vehicle according to a preferred embodiment of the present invention is not limited to a compact track loader, and may be, for example, some other construction machine or agricultural machine such as a skid-steer loader, a backhoe, or a tractor.

The working vehicle 1 includes a machine body 2, a cabin 3, a working device 4, and traveling device(s) 5. The cabin 3 is provided on the machine body 2. The cabin 3 includes an operator's seat 8, operation members (manual operators) to be operated by an operator seated on the operator's seat 8, and/or the like. The operation members include a travel operation member 6 to operate the traveling devices 5 and a work operation member 7 to operate the working device 4.

The traveling devices 5 are provided on the left and right sides of the machine body 2 and support the machine body 2 such that the machine body 2 is allowed to travel. The traveling devices 5 are crawler traveling devices. The operator operates the travel operation member 6 to cause both the left and right traveling devices 5 to rotate in a forward direction, both the left and right traveling devices 5 to rotate in a reverse direction, only one of the left and right traveling devices 5 to rotate in the forward direction, or one of the left and right traveling devices 5 to rotate in the forward direction and the other to rotate in the reverse direction to cause the machine body 2 (working vehicle 1) to travel forward, rearward, or turn left or right.

The working device 4 is attached to the machine body 2. The working device 4 includes a bucket 30a, boom(s) 11, lift link(s) 12, control link(s) 13, boom cylinder(s) 14, front cylinder(s) 15, and a quick hitch 16. The booms 11, the lift links 12, the control links 13, the boom cylinders 14, and the front cylinders 15 are provided at the left and right of the cabin 3. The left and right booms 11 are connected to each other by a connector 17 at an intermediate portion of their front portion. The left boom 11 has, at the front portion thereof, a hydraulic fluid outlet port (power output port) 18a and a hydraulic fluid inlet port 18b.

The lift links 12 and the control links 13 support proximal portions (rear portions) of the booms 11 via shafts such that the booms 11 are swingable up and down. The boom cylinders 14 each have one end thereof pivotally connected to a corresponding one of the booms 11 via a shaft and the other end thereof pivotally connected to a lower rear portion of the machine body 2 via a shaft. Upon operation of the work operation member 7 along a first direction by the operator of the working vehicle 1, the boom cylinders 14 extend or retract and the booms 11 ascend or descend (swing upward or downward).

The booms 11 are provided with the quick hitch 16 at the distal ends thereof. The quick hitch 16 is a linkage configured to easily attach and detach any of various attachments (hydraulic driven working tools) 30 such as the bucket 30a. The operator of the working vehicle 1 can easily change attachments 30 using the quick hitch 16. The quick hitch 16 is therefore also called "quick changer". In the example shown in FIG. 19, the bucket 30a which is an example of the attachment 30 is attached to a front portion of the quick hitch 16.

The quick hitch 16 has, connected to a rear portion thereof, the distal ends of the booms 11 and ends of the front cylinders 15 via respective shafts such that the booms 11 and the front cylinders 15 are pivotable. The opposite ends of the front cylinders 15 are pivotally connected to the connector 17 via shafts. Upon operation of the work operation member 7 along a second direction by the operator, the front cylinders 15 extend or retract and the quick hitch 16 swings upward or rearward. With this, the bucket 30a attached to the quick hitch 16, swinging upward or downward, performs shoveling or dumping.

Figure 20:
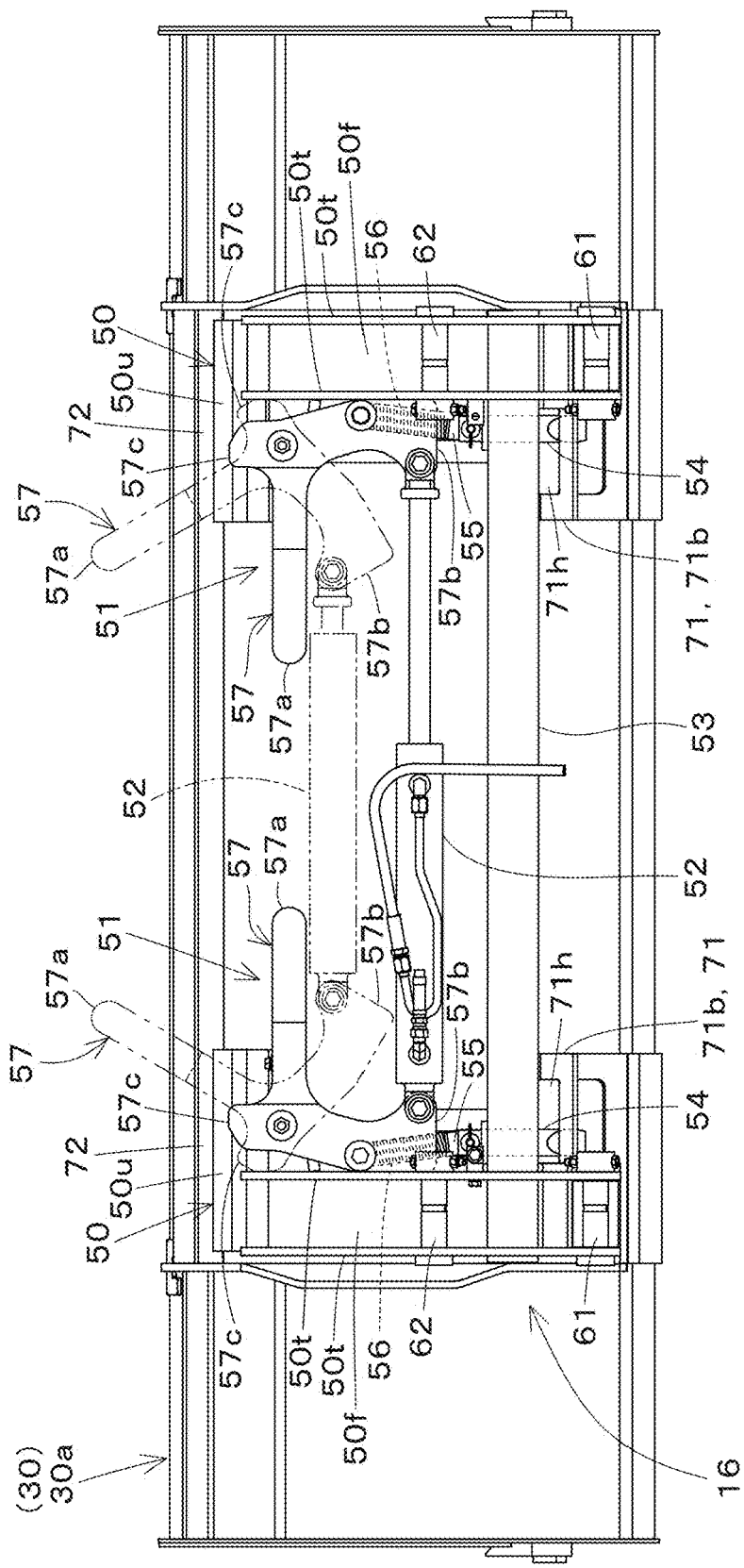
FIG. 20 is an elevational view of a quick hitch.
Figure 21A:
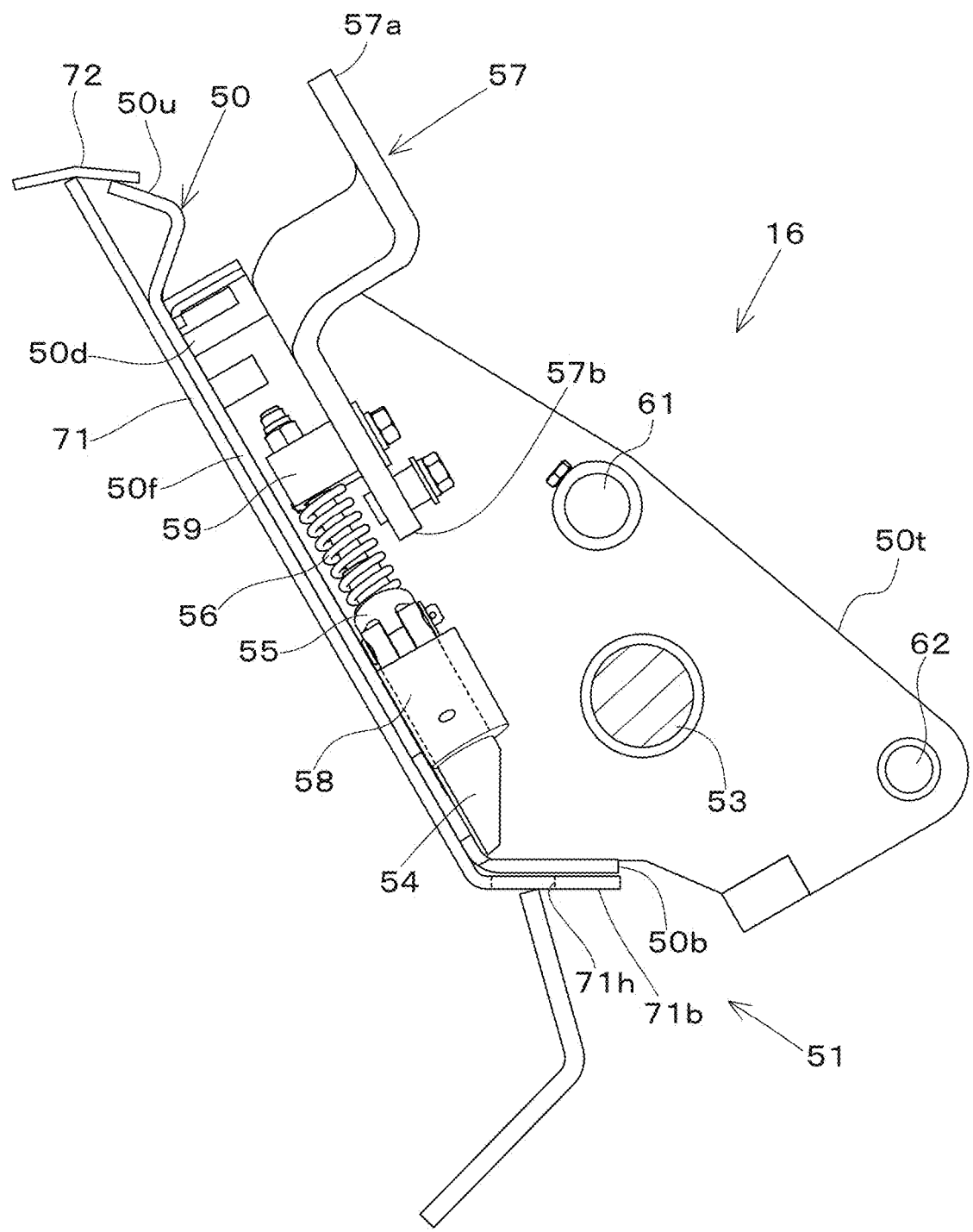
FIG. 21A is a side view of an attachment unlatched by a quick hitch.
Figure 21B:
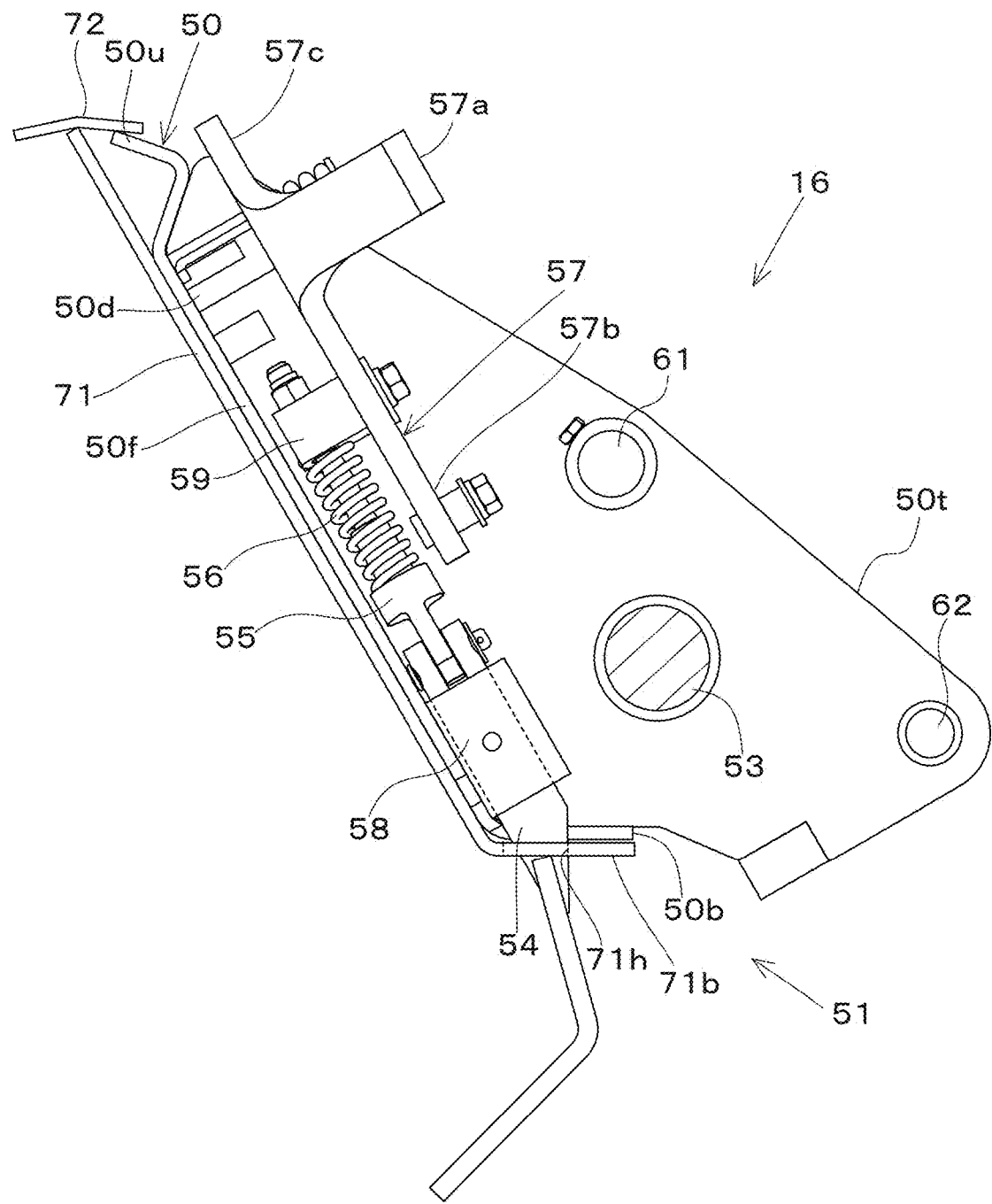
FIG. 21B is a side view of an attachment latched by a quick hitch.

FIG. 20 is an elevational view of the quick hitch 16. Specifically, FIG. 20 illustrates the quick hitch 16 in FIG. 19 as viewed from the machine body 2 of the working vehicle 1. FIG. 21A is a side view illustrating the quick hitch 16 in an unlatching state. FIG. 21B is a side view illustrating the quick hitch 16 in a latching state.

The quick hitch 16 includes a pair of left and right brackets 50, a pair of left and right latching mechanisms 51, a latch cylinder 52, and the like. The brackets 50 hold the attachment 30. The latching mechanisms 51 are selectively operable in a latching state in which the attachment 30 is secured to the brackets 50 (quick hitch 16) or an unlatching state in which the attachment 30 is allowed to be detached from the brackets 50. The latch cylinder 52 is a latch actuator to place the latching mechanisms 51 selectively in the latching state or the unlatching state.

As illustrated in FIG. 21A, each of the brackets 50 includes a front plate 50f and a pair of connector plates 50t projecting rearward from the front plate 50f. The connector plates 50t have pivotally connected thereto the distal ends of the left and right booms 11 (FIG. 19) via shafts 61, and have pivotally connected thereto ends of the left and right front cylinders 15 (FIG. 19) via shafts 62. The connector plates 50t are connected to a beam 53, so that the pair of brackets 50 are combined.

The front plate 50f of each of the brackets 50 includes an upper portion 50u bent in the form of the letter V as illustrated in FIG. 21A. The front plate 50f includes a lower portion 50*b* bent such that the lower portion 50*b* projects diagonally rearward. A top plate 72 bent downward is provided above a base plate 71 of the attachment 30. The base plate 71 includes a lower portion 71*b* bent such that the lower portion 71*b* projects diagonally rearward. The lower portion 71*b* of the base plate 71 has a through-hole 71*h*.

The upper portions 50*u* of the front plates 50*f* of the brackets 50 are inserted into the gap between the base plate 71 and the top plate 72 of the attachment 30 and engage with the back surface of the top plate 72, the front surfaces of the front plates 50*f* engage with the base plate 71, and the lower portions 50*b* of the front plates 50*f* engage with the lower portion 71*b* of the base plate 71. With this, the attachment 30 is held by the brackets 50.

The latching mechanisms 51 are located inward of the connector plates 50*t* of the brackets 50 in FIG. 20. Each of the latching mechanisms 51 includes, as illustrated in FIG. 21A, a latch pin 54, a link 55, a coil spring 56, a latch lever 57, and the like. The latch pin 54 is held by a housing 58 fixed to a corresponding bracket 50 such that the latch pin 54 is movable up and down. The latch pin 54 includes a lower portion projecting downward from the housing 58, and the lower portion has an inclined surface sloping diagonally forward and downward. The latch pin 54 includes an upper portion rotatably connected to a lower end portion of the link 55 via pin(s). The link 55 is inserted in the coil spring 56. The link 55 includes an upper end portion projecting from the coil spring 56, and the upper end portion is held by a holder 59.

Each latch lever 57 is substantially in the form of the letter L as illustrated in FIG. 20. The latch lever 57 includes a bent intermediate portion which is rotatably connected to a mount 50*d* on a corresponding bracket 50 via pin(s) as illustrated in FIG. 21A. The latch lever 57 includes a first projecting portion 57*a* which projects inward from corresponding connector plates 50*t* as illustrated in FIG. 20. The latch lever 57 includes a second projecting portion 57*b* projecting downward. The second projecting portion 57*b* has, connected to a back surface of a central portion thereof, the holder 59 via pin(s) as illustrated in FIG. 21A. The latch lever 57 includes a third projecting portion 57*c* which projects upward as illustrated in FIG. 20.

The latch cylinder 52 is a hydraulic cylinder which is positioned laterally and located above the beam 53. The latch cylinder 52 has a first end (distal end of the rod) pivotally connected to the distal end portion of the second projecting portion 57*b* of one of the latch levers 57 (right latch lever 57 in FIG. 20) via pin(s). The latch cylinder 52 has a second end (bottom of the cylinder case) pivotally connected to the distal end portion of the second projecting portion 57*b* of the other of the latch levers 57 (the left latch lever 57 in FIG. 20) via pin(s).

The retraction of the latch cylinder 52, as indicated by dot-dot-dash lines in FIG. 20, causes the second projecting portions 57*b* of the left and right latch levers 57 to approach each other, causing the latch levers 57 to pivot upward. Then, as illustrated in FIG. 21A, the links 55 and the latch pins 54 move upward and the latch pins 54 detach from the through-holes 71*h* in the base plate 71 of the attachment 30.

With this, the latching mechanisms 51 are placed in their unlatching state (also referred to as "unlock state") in which the latching mechanisms 51 do not hold the attachment 30, allowing the attachment 30 to be detached from the quick hitch 16. The third projecting portions 57*c* of the latch levers 57 contact corresponding connector plates 50*t* of the brackets 50, so that the degree of retraction of the latch cylinder 52, the angle of upward rotation of the latch levers 57, and the degree of upward movement of the latch pins 54 are restricted.

Upon the extension of the latch cylinder 52 as indicated by solid lines in FIG. 20 from the state as illustrated in FIG. 21A, the second projecting portions 57*b* of the left and right latch levers 57 are pushed to cause the latch levers 57 to pivot downward. Upon such pivoting, the holders 59 cause the links 55 and the latch pins 54 to move downward and compress the coil springs 56. Then, as illustrated in FIG. 21B, the latch pins 54 are inserted in the through-holes 71*h* in the base plate 71 of the attachment 30, so that the inclined surfaces of the latch pins 54 contact the side walls of the through-holes 71*h*.

With this, the latching mechanisms 51 are placed in their latching state (also referred to as "lock state") in which the latching mechanisms 51 hold the attachment 30, and the attachment 30 is attached to the quick hitch 16. The second projecting portions 57*b* of the latch levers 57 contact corresponding connector plates 50*t* of the brackets 50, so that the degree of extension of the latch cylinder 52, the angle of downward rotation of the latch levers 57, and the degree of downward movement of the latch pins 54 are restricted. It is noted here that the spring back force of the coil springs 56 holds the latch levers 57 in position. Since the first projecting portions 57*a* of the latch levers 57 are positioned horizontally, the operator seated on the operator's seat 8 of the working vehicle 1 confirms that the attachment 30 is attached to the quick hitch 16 (working vehicle 1) by looking at the horizontally positioned first projecting portions 57*a*.

Starting from the state as illustrated in FIG. 19 in which the bucket 30*a* is attached to the quick hitch 16, the bucket 30*a* is detached and another attachment 30 is attached to the quick hitch 16. This makes it possible to perform work other than excavation (or some other excavation work) using the other attachment 30.

Examples of attachments 30 other than the bucket 30*a* include pallet forks, skid cutters, crushers, breakers, angle brooms, earth augers, grapple, sweepers, mowers, snow blowers, and spreaders. Attachments 30 of each type may have different specifications such as sizes and/or shapes.

FIG. 1 is a block diagram of an attachment usage system 100 and the working vehicle 1 according to the present preferred embodiment. The attachment usage system 100 includes the working vehicle(s) 1 and attachment(s) 30. The example in FIG. 1 includes one working vehicle 1 and two attachments 30, but the number of working vehicles 1 and the number of attachments 30 included in the attachment usage system 100 may be selected appropriately.

The working vehicle 1 includes a controller 21, one or more nonvolatile memories 22, a beacon scanner 23, a communicator 24, a user interface (indicated as "UI" in FIG. 1) 25, a battery 20, switches (each indicated as "SW" in FIG. 1) 26 to 29, and/or the like. The controller 21 includes a processor or a computer, which includes a CPU, one or more memories, and/or the like The controller 21 controls elements of the working vehicle 1. The controller 21 includes an internal memory 21*a* (first memory) which is a volatile memory or a nonvolatile memory. The controller 21 may, for example, use a predetermined storage area of the internal memory 21*a* which is a volatile memory as a buffer for temporary storage of information and data.

The one or more nonvolatile memories 22 (second memory, third memory) are provided externally to the controller 21. The internal memory 21*a* and the nonvolatile memory 22 store software program(s) and control data for the controller 21 to control operation of the elements. The nonvolatile memory 22 stores pieces of control data corresponding to various attachments 30.

The beacon scanner 23 is a receiver to receive wireless signals (beacon signals) compliant with Bluetooth (registered trademark) Low Energy which is a near field communication standard. The beacon scanner 23 measures the received signal strength indicator (RSSI, received signal strength) of the received wireless signals.

The communicator 24 communicates with a portable device 70 via the Internet or wireless LAN. The portable device 70 is a smartphone, a tablet computer, and/or the like. The user interface 25 includes, for example, a touchscreen (touch panel) and/or the like. For another example, the user interface 25 may include an input and an output provided independently of each other.

The battery 20 supplies electricity to electric equipment in and/or on the working vehicle 1. The attaching switch 26, the detaching switch 27, the auxiliary mode switch 28, and the auxiliary output switch 29 are respective operation switches to be operated by the operator of the working vehicle 1. The attaching switch 26 and the detaching switch 27 are momentary operation switches. The user interface 25 and the switches 26 to 29 are provided operably in the vicinity of the operator's seat 8 in the cabin 3.

The attaching switch (first operation switch) 26 is operated to attach the attachment 30 to the quick hitch 16. The detaching switch (second operation switch) 27 is operated to allow the attachment 30 to be detached from the quick hitch 16. The auxiliary mode switch 28 is operated to start an auxiliary mode in which predetermined attachment(s) 30 are usable. The auxiliary output switch (third operation switch) 29 is operated to supply (transmit) hydraulic fluid as power to the hydraulic fluid outlet port 18a.

The working vehicle 1 includes, as hydraulic-related features, a main pump P1, a pilot pump P2, a control valve unit (indicated as "CVU" in FIG. 1) 40, a proportional valve 41, a regulator 42, sensors 43 and 44, hydraulic actuators 14, 15, 46L, 46R, and 52, fluid passage(s), a tank, and/or the like. The main pump P1 and the pilot pump P2 are driven by power from a prime mover 9 to deliver hydraulic fluid sucked from the tank to fluid passage(s). The prime mover 9 includes, for example, an engine. For another example, the prime mover 9 may include an electric motor.

The main pump P1 is a variable displacement hydraulic pump. The regulator 42 changes the angle of the swash plate of the main pump P1. The controller 21 controls the opening of the proportional valve 41 to apply pilot pressure, which is the hydraulic pressure of hydraulic fluid delivered by the pilot pump P2, to the regulator 42. The controller 21 then actuates the regulator 42 to change the angle of the swash plate of the main pump P1 to change the amount of hydraulic fluid delivered by the main pump P1. Operating equipment 47 includes the travel operation member 6 and work operation member 7, operating valves corresponding to the travel operation member 6 and the work operation member 7, switching valve(s), and the like.

The control valve unit 40 allows hydraulic fluid supplied from the main pump P1 through fluid passage(s) to flow to the boom cylinders 14 and the front cylinders 15 of the working device 4, the latch cylinder 52 of the quick hitch 16, and the hydraulic fluid outlet port 18a. The control valve unit 40 also allows hydraulic fluid that flows from the boom cylinders 14, the front cylinders 15, the latch cylinder 52, and the hydraulic fluid inlet port 18b (return fluid) to be discharged. The control valve unit 40 controls the direction and amount of supply of hydraulic fluid to the boom cylinders 14, the front cylinders 15, and the latch cylinder 52. The control valve unit 40 also controls the amount of supply of hydraulic fluid to the hydraulic fluid outlet port 18a.

Specifically, the control valve unit 40 includes control valves 40a, 40b, 40c, and 40d corresponding to the boom cylinders 14, the front cylinders 15, the latch cylinder 52, and the ports 18a and 18b. Each of the control valves 40a, 40b, 40c, and 40d is switchable between a neutral position, a first position, and a second position. At least the control valves 40c and 40d the control valves 40a, 40b, 40c, and 40d are electrically actuated. The control valves 40a, 40b, 40c, and 40d are normally held in the neutral position by the elastic force of a spring.

The operating valve(s) of the operating equipment 47 and/or the like that correspond to the work operation member 7 are actuated according to the manner in which the work operation member 7 is operated, thus allowing the pilot pressure of pilot fluid from the pilot pump P2 to act on pressure receiver(s) of the control valve(s) 40a and/or 40b. With this, the control valve(s) 40a and/or 40b is/are switched from the neutral position to the first position or the second position, so that hydraulic fluid from the main pump P1 is supplied through the control valve(s) 40a and/or 40b to the boom cylinders 14 and/or the front cylinders 15 to cause the boom cylinders 14 and/or the front cylinders 15 to extend or retract. It follows that the booms 11 and/or the attachment 30 such as the bucket 30a attached to the quick hitch 16 swing.

While the attaching switch 26 is being operated, the controller 21 places the control valve 40c in the first position to allow hydraulic fluid from the main pump P1 to be supplied to the latch cylinder 52 in the first direction to cause the latch cylinder 52 to extend. Accordingly, the operation of the attaching switch 26 that lasts for a first predetermined period of time T1 or more while the latching mechanisms 51 are in the unlatching state causes the latch cylinder 52 to extend to the predetermined degree or more, bringing the latching mechanisms 51 into the latching state. Even if the attaching switch 26 is operated, provided that the operation only lasts for a period less than the first predetermined period of time T1, the latch cylinder 52 does not extend to the predetermined degree or more and therefore the latching mechanisms 51 are not brought into the latching state. Therefore, the latching mechanisms 51 are moved back by the spring back force of the coil springs 56 to the original unlatching state.

On the contrary, while the detaching switch 27 is being operated, the controller 21 places the control valve 40c in the second position to allow hydraulic fluid from the main pump P1 to be supplied to the latch cylinder 52 in a second direction opposite to the first direction to cause the latch cylinder 52 to retract. Accordingly, the operation of the detaching switch 27 that lasts for a second predetermined period of time T2 or more while the latching mechanisms 51 are in the latching state causes the latch cylinder 52 to retract to a predetermined degree or more, bringing the latching mechanisms 51 into the unlatching state. Even if the detaching switch 27 is operated, provided that the operation only lasts for a period less than the second predetermined period of time T2, the latch cylinder 52 does not retract to the predetermined degree or more and therefore the latching mechanisms 51 are not brought into the unlatching state. Therefore, the latching mechanisms 51 are moved back by the spring back force of the coil springs 56 to the original latching state.

The first predetermined period of time T1 and the second predetermined period of time T2 are each, for example, about 2 to 3 seconds. The first predetermined period of time T1 and the second predetermined period of time T2 may be the same period or different periods. The specific values of the first predetermined period of time T1 and the second predetermined period of time T2 are examples, and not limited to the values above. The same applies to a third predetermined period of time T3 and a period of time T4 (described later).

When the auxiliary mode switch 28 is operated and the auxiliary mode is selected, a specific attachment 30 is attached to the quick hitch 16. The hydraulic fluid outlet port 18a and a hydraulic fluid inlet port 38b of the specific attachment 30b are connected together by a hose, and the hydraulic fluid inlet port 18b and a hydraulic fluid outlet port 38a of the specific attachment 30b are connected together by a hose.

Upon operation of the auxiliary output switch 29 under such circumstances, the controller 21 switches the control valve 40d from the neutral position to the first position or the second position. With this, hydraulic fluid from the main pump P1 is supplied (transmitted) through a fluid passage 45a to the hydraulic fluid outlet port 18a, and hydraulic fluid flowing into a fluid passage 45b from the hydraulic fluid inlet port 18b is drained through the control valve unit 40.

With this, hydraulic fluid discharged through the hydraulic fluid outlet port 18a is introduced into the specific attachment 30b through the hydraulic fluid inlet port 38b via a hose or the like. Furthermore, hydraulic fluid (return fluid) discharged through the hydraulic fluid outlet port 38a of the specific attachment 30b is introduced through the hydraulic fluid inlet port 18b via a hose or the like and is drained from the control valve unit 40. Since hydraulic fluid is introduced and discharged to and from the specific attachment 30b as such, hydraulic actuators 36 such as a hydraulic motor and/or hydraulic cylinder(s) of the attachment 30b are actuated, making it possible to perform work using the attachment 30b.

When allowing hydraulic fluid to be introduced and discharged to and from the specific attachment 30b, the controller 21 changes the opening of the control valve 40d depending on what specific attachment 30b is attached to the quick hitch 16, to adjust the flow rate or hydraulic pressure of hydraulic fluid supplied to the hydraulic fluid outlet port 18a. For example, the controller 21 may cause the flow rate sensor 43 to detect the flow rate of hydraulic fluid flowing through the fluid passage 45a and control the opening of the control valve 40d. Additionally or alternatively, the controller 21 may cause the pressure sensor 44 to detect the hydraulic pressure of hydraulic pressure flowing through the fluid passage 45a and control the opening of the control valve 40d.

The pair of left and right traveling devices 5 include a pair of left and right hydro-static transmissions (HSTs) 46L and 46R corresponding to the pair of left and right traveling devices 5. Each of the HSTs 46L and 46R includes hydraulic pump(s) and a travel motor (hydraulic motor).

The operating valve(s) of the operating equipment 47 and/or the like that correspond to the travel operation member 6 are actuated according to the manner in which the travel operation member 6 is operated, thus changing the angle of inclination of the swash plate(s) of the hydraulic pump(s) of the HST(s) 46L and/or 46R. This controls the supply, the stopping of supply, and the direction of supply of hydraulic fluid from the hydraulic pump(s) of the HSTs 46L and/or 46R to the travel motor(s), the travel motor(s) rotate (s) in the forward direction, rotate in the reverse direction, or stop, the left and/or right traveling device(s) 5 also rotate(s) in the forward direction, rotate in the reverse direction, or stop, and the working vehicle 1 travels forward, rearward, turn left or right, or stops.

Furthermore, switching valve(s) for speed changes of the operating equipment 47 and/or like switch(es) positions according to control signal(s) from the controller 21, thus changing the angle of inclination of the swash plate(s) of the travel motor(s) of the HSTs 46L and/or 46R. With this, the rotation speed of the travel motor(s) increases or decreases, so that the travel speed of the traveling devices 5 and the working vehicle 1 is changed.

The attachment 30 attachable to the working vehicle 1 is provided with a beacon transmitter 33. The beacon transmitter 33 is a transmitter to periodically transmit an advertisement signal (also called "advertisement packet" or "beacon signal") which is a wireless signal compliant with Bluetooth (registered trademark) Low Energy. The beacon transmitter 33 looks like a small tag, and is therefore sometimes called a "BLE tag". The beacon transmitter 33 includes a microcomputer, a memory, a transmitter circuit, a battery, a vibration sensor 34, and/or the like. The elements of the beacon transmitter 33 are driven by electricity from the battery. The beacon transmitter 33 transmits the advertisement signal at interval(s) of, for example, about 1 second to about 3 seconds, but the intervals are not limited to 1 second to 3 seconds and may be selected as appropriate.

Figure 2:
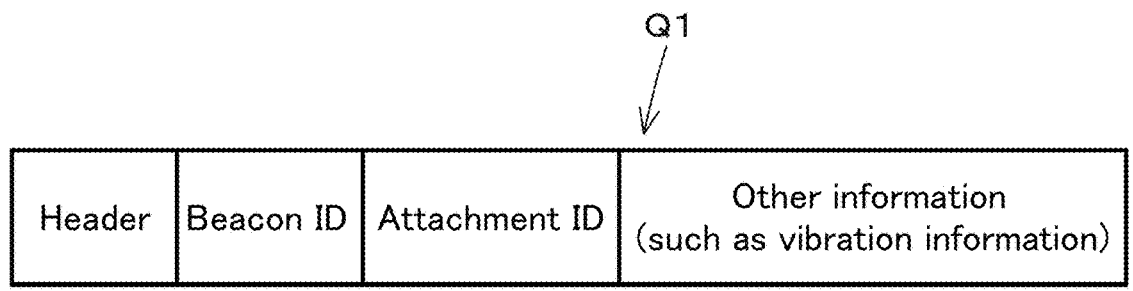
FIG. 2 is a diagram showing an example of information included in an advertisement signal.

FIG. 2 shows an example of information contained in an advertisement signal Q1 transmitted from the beacon transmitter 33. The advertisement signal Q1 includes a header, a beacon ID, an attachment ID, and other information. The beacon ID is identification information of the beacon transmitter 33 which is the sender of the advertisement signal Q1. The attachment ID is identification information of the attachment 30 in or on which the beacon transmitter 33 which is the sender of the advertisement signal Q1 is provided.

The other information in the advertisement signal Q1 includes vibration information relating to the vibration state detected by the vibration sensor 34 of the beacon transmitter 33 which is the sender, i.e., vibration information relating to the vibration state of the attachment 30 in or on which the beacon transmitter 33 is provided. The vibration information may include information such as a message indicating whether or not the attachment 30 is vibrating (presence or absence of vibration). The vibration information may include, instead of or in addition to the information such as a message, a vibration indicator (numerical value) indicating the magnitude of vibration detected by the vibration sensor 34. The vibration indicator may be, for example, at least one of the displacement, velocity, or acceleration of vibrations of the attachment 30 detected by the vibration sensor 34. Inertial sensor(s) such as an acceleration sensor and/or a gyroscope sensor may be used as the vibration sensor 34.

As illustrated in FIG. 19, the beacon transmitter 33 is located on, for example, the back surface of the attachment 30 that faces the machine body 2 of the working vehicle 1. The beacon scanner 23 is located at, for example, the front portion of the machine body 2 that faces the attachment 30. The controller 21 is provided in the machine body 2. Since the beacon scanner 23 is provided in or on the machine body 2, it is possible to achieve a configuration in which output signals from the beacon scanner 23 can be inputted into the controller 21 using simple electric wiring or simple communication circuit(s) as compared to cases where the beacon scanner 23 is provided on the movable working device 4.

The advertisement signal Q1 transmitted from the beacon transmitter 33 is received by the beacon scanner 23 of the working vehicle 1. The controller 21 identifies (recognizes) the attachment 30 based on the attachment ID included in the advertisement signal Q1 received by the beacon scanner 23.

In the case where one or more attachments 30 are present in the vicinity of the working vehicle 1, one or more advertisement signals Q1 from one or more beacon transmitters 33 of the one or more attachments 30 are received by the beacon scanner 23. Upon receipt of each advertisement signal Q1, the beacon scanner 23 measures the RSSI of the advertisement signal Q1.

The controller 21 reads the one or more attachment IDs from the one or more advertisement signals Q1 received by the beacon scanner 23. The controller 21 then cause the internal memory (first memory) 21a to store the one or more attachment IDs read from the one or more advertisement signals Q1 for a period of time T4, so that attachment IDs are collected in the internal memory 21a.

Upon attachment of an attachment 30 to the quick hitch 16, the controller 21 selects the attachment ID of the attachment 30 attached to the quick hitch 16 from the attachment IDs stored in the internal memory 21a. The controller 21 then identifies the specifications and/or the like of the attachment 30 attached to the quick hitch 16 based on the selected attachment ID, and starts a predetermined process according to the attachment ID.

An example of the predetermined process is a process in which the controller 21 causes the user interface 25 to output (display) information indicating that the attachment 30 corresponding to the selected attachment ID is attached to the quick hitch 16 (working vehicle 1). Another example of the predetermined process is a process in which the controller 21 controls output of hydraulic fluid (power) to the attachment 30 attached to the quick hitch 16 (controls start and stop of the supply of hydraulic fluid to the attachment 30) according to the selected attachment ID. It is noted here that the controller 21 may also control at least one of the introduction of hydraulic fluid from the attachment 30, the amount of hydraulic fluid supplied to the attachment 30, or the pressure of hydraulic fluid supplied to the attachment 30.

With the attachment usage system 100, an automatic selection mode or a manual selection mode can be selected by, for example, an administrator performing a predetermined operation on the user interface 25. The automatic selection mode is a mode in which the controller 21 selects the attachment ID of the attachment 30 attached to the quick hitch 16 from the attachment ID(s) stored in the first memory 21a and starts a predetermined process according to the selected attachment ID. In the automatic selection mode, the controller 21 identifies the attachment 30 attached to the quick hitch 16 based on the attachment ID selected based on a predetermined condition from the attachment ID(s) stored in the internal memory 21a.

The manual selection mode is a mode in which the controller 21 starts a predetermined process according to information relating to the attachment 30 received via the user interface 25. That is, in the manual selection mode, for example, the operator of the working vehicle 1 inputs information relating to the attachment 30 attached to the quick hitch 16 via the user interface 25. In the manual selection mode, the controller 21 identifies the attachment 30 attached to the quick hitch 16 based on the information relating to the attachment 30 inputted via the user interface 25. The administrator uses the user interface 25 to place the working vehicle 1 in the automatic selection mode or the manual selection mode according to the demand of the operator of the working vehicle 1 or the like.

Display data and control data are pre-set for each of the attachment IDs of attachments 30 attachable to the quick hitch 16, i.e., attachments 30 which can be used with the working vehicle 1.

FIG. 3 is a table showing an example of the relationship between the attachment IDs of the attachments 30 attachable to the quick hitch 16 and pieces of display data corresponding to the attachments 30. A piece of display data is data based on which the user interface 25 displays information about a corresponding attachment 30. The display data includes, for example, an icon, name, and specifications of the corresponding attachment 30. Such an attachment ID and display data of the attachment 30 are stored in a predetermined storage area of the nonvolatile memory 22 such that the attachment ID and the display data of the attachment 30 are associated with each other. Note that display data other than that described above may be stored in the nonvolatile memory 22 such that the display data is associated with the attachment ID.

FIG. 4 is a table showing an example of the relationship between the attachment IDs of the attachments 30 attachable to the quick hitch 16 and pieces of control data corresponding to the attachments 30. A piece of control data indicates control performed by the working vehicle 1 according to what attachment 30 is used. The control data includes, for example, the level of the amount of hydraulic fluid supplied to the corresponding attachment 30. Such an attachment ID and control data of the attachment 30 are stored in a predetermined storage area of the nonvolatile memory 22 such that the attachment ID and the control data of the attachment 30 are associated with each other. Note that other control data, such as the level of hydraulic pressure outputted to the attachment 30 and/or the output value of power other than hydraulic fluid, may be stored in the nonvolatile memory 22 such that the control data is associated with the attachment ID.

Figure 5:
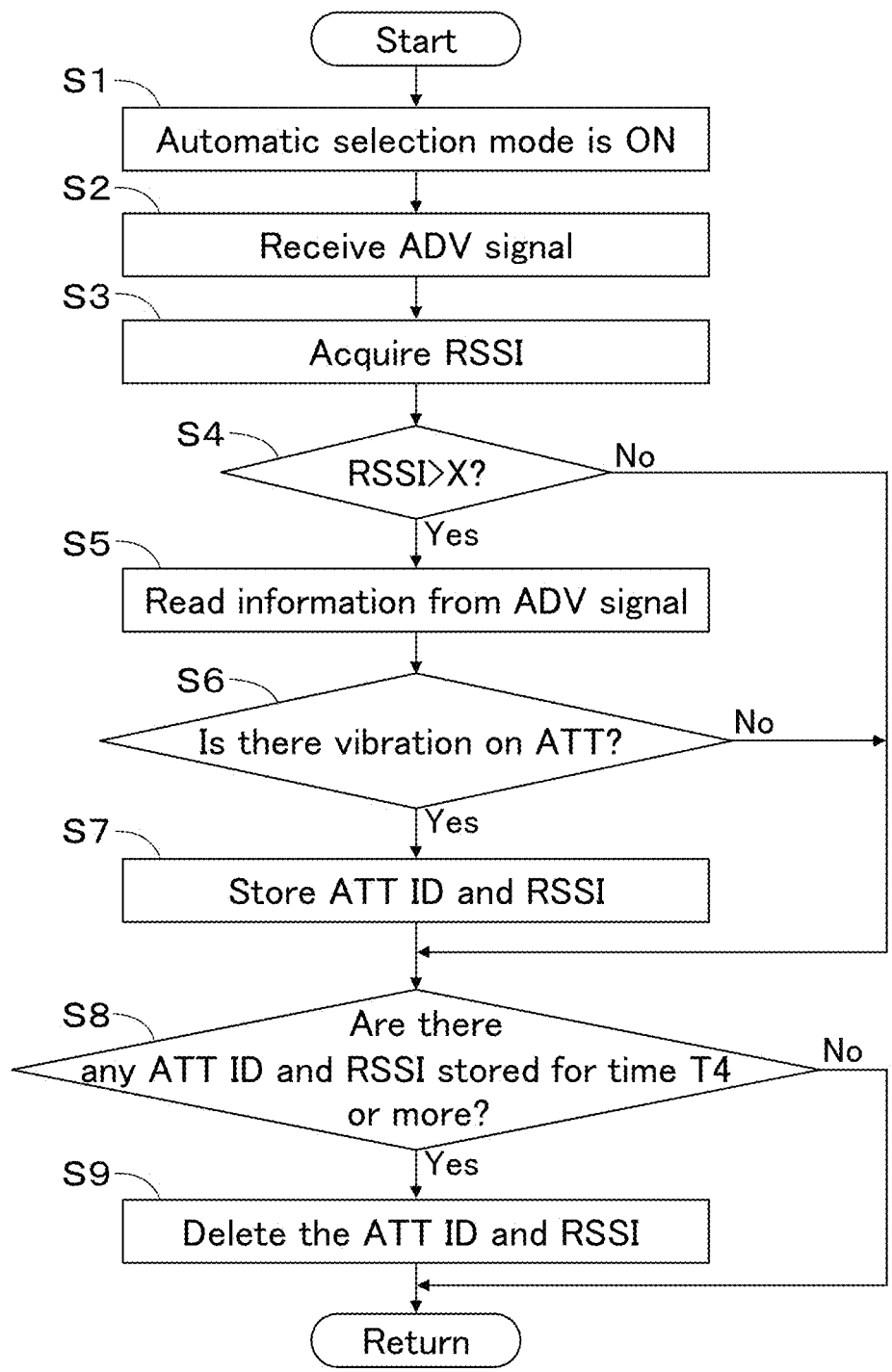
FIG. 5 is a flowchart showing an example of an attachment information collecting process.

FIG. 5 is a flowchart showing an example of an attachment information collecting process. The attachment information collecting process is performed by the controller 21 of the working vehicle 1 based on software program(s) stored in the internal memory 21a or the nonvolatile memory 22. The same applies to a securing-of-attachment recognizing process and a release-of-attachment recognizing process (described later). In FIG. 5, the advertisement signal Q1 is referred to as "ADV signal" and the attachment is referred to as "ATT" for convenience of description. The same applies to FIGS. 7, 10, 12 to 14, and 16 to 18 (described later).

In the case where the automatic selection mode is selected (S1 in FIG. 5), upon receipt of an advertisement signal Q1 from the beacon transmitter 33 by the beacon scanner 23 (S2), the controller 21 acquires the RSSI of the advertisement signal Q1 from the beacon scanner 23 (S3). Next, if the acquired RSSI is greater than a predetermined value (first predetermined value) X (YES in S4), the controller 21 reads information from the received advertisement signal Q1 (S5).

Next, if the information read from the advertisement signal Q1 includes vibration information indicating that the attachment 30 is vibrating, the controller 21 determines that there is vibration on the attachment 30 (YES in S6). Alternatively, if the information read from the advertisement signal Q1 includes a vibration indicator and the vibration indicator is greater than a predetermined value (second predetermined value) Y, the controller 21 determines that there is vibration on the attachment 30 (YES in S6).

Next, the controller 21 causes the internal memory 21a to store the attachment ID included in the received advertisement signal Q1 and the RSSI of the advertisement signal Q1 such that the attachment ID and the RSSI are associated with each other (S7). It is noted here that the controller 21 causes the internal memory 21a to also store, for example, information relating to the time at which the attachment ID and the RSSI were stored (such as a timestamp) such that the information is associated with the attachment ID and the RSSI. The controller 21 may cause the internal memory 21a to also store, for example, a beacon ID and/or other information included in the received advertisement signal Q1 such that the beacon ID and/or the other information are associated with the attachment ID and the RSSI.

In contrast, if the RSSI of the received advertisement signal Q1 is equal to or less than the predetermined value X (NO in S4), the controller 21 does not cause the internal memory 21a to store the attachment ID included in the received advertisement signal Q1 or the RSSI of the advertisement signal Q1. Also if the received advertisement signal Q1 does not include vibration information indicating that the attachment 30 is vibrating (or the vibration indicator greater than the predetermined value Y) and it is determined that there is no vibration on the attachment 30 (NO in S6), the controller 21 does not cause the internal memory 21a to store the attachment ID included in the received advertisement signal Q1 or the RSSI of the advertisement signal Q1.

If any of the attachment ID(s) or RSSI(s) in the internal memory 21a has been stored for the period of time T4 or more (YES in S8), the controller 21 deletes that attachment ID(s) and RSSI(s) from the internal memory 21a (S9). It is noted here that the controller 21 also deletes, from the internal memory 21a, other information (such as time information) corresponding to the attachment ID(s) having been stored for the period of time T4 or more. The period of time T4 is, for example, about 30 seconds which corresponds to at least one of the time for an attachment 30 to be attached to the working vehicle 1 or the time for the attachment 30 to be replaced with another one. After step S9, the controller 21 repeats step S1 and subsequent steps.

Figure 6:
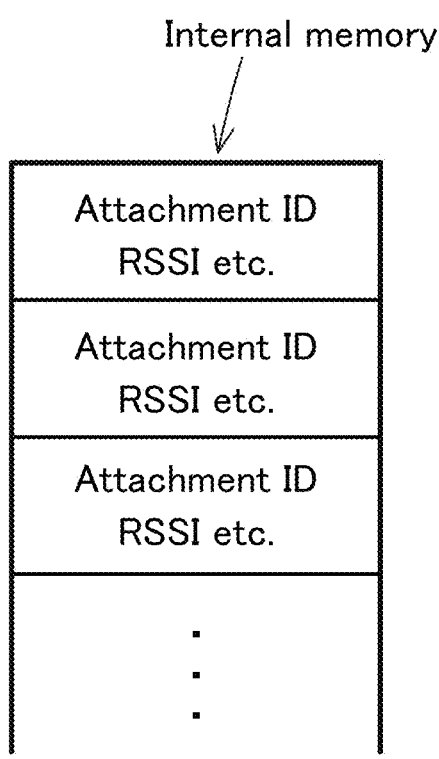
FIG. 6 is a diagram showing an example of information stored in an internal memory of a controller.

FIG. 6 shows information stored in the internal memory 21a of the controller 21. The controller 21 repeats the attachment information collecting process shown in FIG. 5, so that attachment IDs and their corresponding RSSIs are collected in the internal memory 21a as shown in FIG. 6.

Specifically, the controller 21 selects one of the advertisement signal(s) Q1 that is received by the beacon scanner 23 from the beacon transmitter 33 on the attachment 30 which is located close to the quick hitch 16 (working vehicle 1) to some extent and which has vibrated when attached to the quick hitch 16. The attachment ID included in the selected advertisement signal Q1 and the RSSI of that advertisement signal Q1 are stored (collected) in the internal memory 21a of the controller 21 for the period of time T4. For another example, the controller 21 may cause the nonvolatile memory 22 to store the attachment ID and the RSSI of the advertisement signal Q1 for the period of time T4.

When an attachment 30 placed on the ground or the like is to be attached to the working vehicle 1, the operator of the working vehicle 1 operates the traveling device 5 and/or the working device 4 using the operation member(s) 6 and/or 7 to allow the front plates 50f of the brackets 50 of the quick hitch 16 to engage with the base plate 71 of the attachment 30, thus holding the attachment 30 with the brackets 50 (see FIG. 21A). In so doing, in some cases, the operator allows the front plates 50f to engage with the base plate 71 and then allow the booms 11 and/or the quick hitch 16 to swing upward by a predetermined angle using the work operation member 7 to raise the attachment 30 with the working device 4 to some extent to check whether the attachment 30 is held by the brackets 50.

Then, if the operator operates the attaching switch 26 for the first predetermined period of time T1 or more, the controller 21 causes the latch cylinder 52 to extend. With this, the latch levers 57 pivot downward, so that the latch pins 54 are inserted into the through-holes 71h of the base plate 71 of the attachment 30 to allow the attachment 30 to be latched by the latching mechanisms 51 (see FIG. 21B). That is, the attachment 30 is brought into a state in which it is attached to the quick hitch 16 and the working vehicle 1.

During the steps of attaching the attachment 30 described above, the attachment 30 vibrates, for example, when the front plates 50f of the brackets 50 are brought into engagement with the base plate 71 of the attachment 30, when the attachment 30 is raised by the working device 4, and/or when the attachment 30 is latched by the latching mechanisms 51. The advertisement signal Q1 transmitted by the beacon transmitter 33 includes vibration information relating to the vibration state of the attachment 30 that has been detected by the vibration sensor 34 at any of the above-listed points in time.

Figure 7:
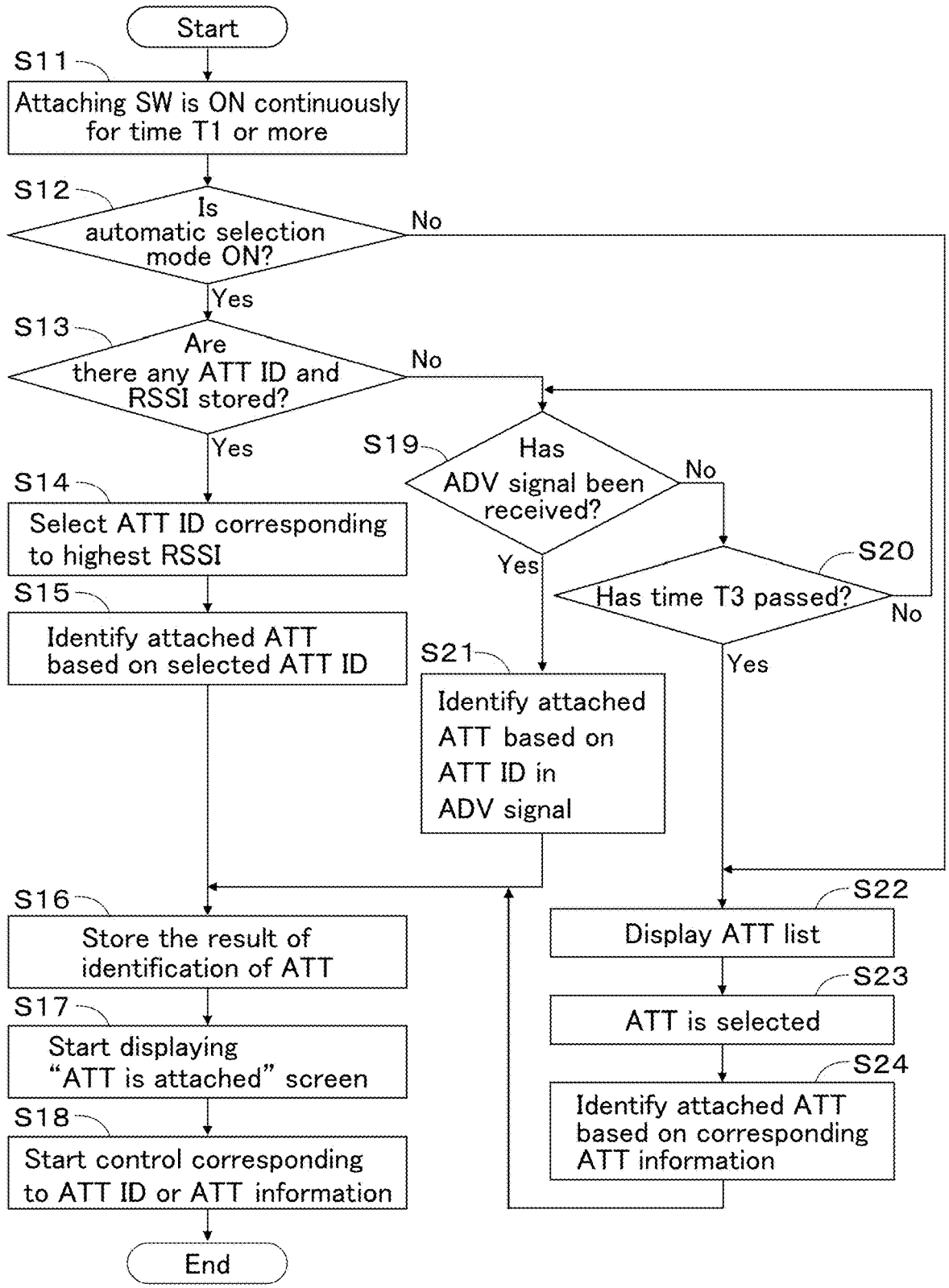
FIG. 7 is a flowchart showing an example of a securing-of-attachment recognizing process.

FIG. 7 is a flowchart showing an example of the securing-of-attachment recognizing process. If the attaching switch 26 is operated continuously (continues to be in ON state) for a first predetermined period of time T1 or more (S11 in FIG. 7) as described earlier, the controller 21 determines that the attachment 30 is attached to (secured to) the quick hitch 16. Next, in the case where the automatic selection mode is selected (YES in S12), the controller 21 determines whether or not any attachment IDs are stored in the internal memory 21a.

If the internal memory 21a stores one or more attachment IDs and corresponding one or more RSSIs therein (YES in S13), the controller 21 reads the one or more RSSIs and the one or more attachment IDs stored in the internal memory 21a, and selects one of the one or more attachment IDs that corresponds to the highest one of the RSSIs (S14). Next, the controller 21 identifies (recognizes) the attachment 30 attached to the quick hitch 16 based on the selected attachment ID (S15).

The one of the one or more advertisement signals Q1 received by the beacon scanner 23 that has the highest RSSI is a signal transmitted from the beacon transmitter 33 located closest to the beacon scanner 23. Therefore, the controller 21 regards, as the attachment ID of the attachment 30 attached to the quick hitch 16, the attachment ID included in an advertisement signal Q1 having the highest RSSI of advertisement signals Q1 received by the beacon scanner 23 during the period of time T4 which ended when the attachment 30 was attached to the quick hitch 16, and selects that attachment ID. Next, the controller 21 identifies the type, other specifications, and/or the like of the attachment 30 attached to the quick hitch 16 based on the selected attachment ID.

The attachment ID corresponding to the highest RSSI as described above is a predetermined condition based on which one of attachment ID(s) collected in the internal memory 21a is to be selected. Note that the RSSIs stored in the internal memory 21a may include one or more highest RSSIs. If a plurality of the highest RSSIs are stored in the internal memory 21a, such RSSIs have the same value and correspond to the same attachment ID. Therefore, the controller 21 may select one of the same attachment IDs (for example, the attachment ID corresponding to the latest receipt time) and identify the attachment 30 attached to the quick hitch 16 based on the selected attachment ID.

Next, the controller 21 causes the nonvolatile memory 22 to store the result of identification of the attachment 30 (S16). It is noted here that the controller 21 causes the nonvolatile memory 22 to store information indicating that the identified attachment 30 is attached to the quick hitch 16, i.e., to the working vehicle 1, and the attachment ID of the attached attachment 30.

The controller 21 starts a display process (predetermined process) in which the controller 21 causes the user interface 25 to display (output) an "attachment is attached" screen G1 which indicates that the attachment 30 corresponding to the selected attachment ID is attached and which displays attachment information relating to the attached attachment 30 (S17).

Figure 8:
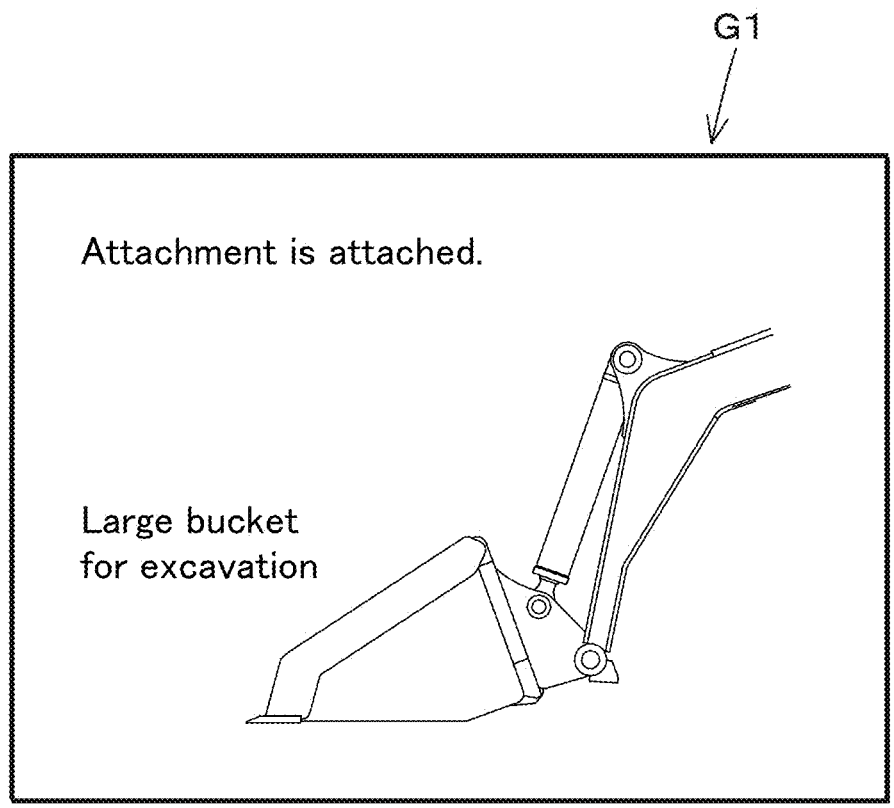
FIG. 8 illustrates an example of an "attachment is attached" screen.

FIG. 8 illustrates an example of the "attachment is attached" screen G1. The "attachment is attached" screen G1 displays a message indicating that the attachment 30 is attached, the attachment information relating to the attached attachment 30, and an icon of the attachment 30. In the example in FIG. 8, the attachment information "Large bucket" "for excavation" is displayed. Additionally or alternatively, other attachment information such as the attachment ID, size, and/or manufacturer of the attachment 30 may be displayed (the same applies to FIG. 11 described later). The display data for the "attachment is attached" screen G1 and the attachment information are prestored in the nonvolatile memory 22.

For another example, the controller 21 may cause the communicator 24 (FIG. 1) to transmit, to the portable device 70, the display data for the "attachment is attached" screen G1 and the attachment information of the attachment 30 which has been determined as being attached so that the "attachment is attached" screen G1 is displayed on a display of the portable device 70.

The controller 21 starts predetermined control (predetermined process) according to the attachment ID selected in step S14 (S18). In so doing, the controller 21 reads control data corresponding to the selected attachment ID form the nonvolatile memory 22 and starts control corresponding to the attachment 30 attached to the quick hitch 16 based on the control data.

Specifically, in the case where the attachment 30 attached to the quick hitch 16 is an attachment 30b including a hydraulic actuator such as a skid cutter, the controller 21 starts causing the control valve 40d to control the output of hydraulic fluid from the hydraulic fluid outlet port 18a to the attachment 30b, based on the control data read from the nonvolatile memory 22. With this, draining of return fluid to be introduced from the attachment 30b into the hydraulic fluid inlet port 18b is also started. The controller 21 may, for example, cause the "attachment is attached" screen G1 to display a message indicating that the control of the output of hydraulic fluid to the attachment 30b has been started.

Note that, in the case where the attachment 30 attached to the quick hitch 16 is an attachment 30 including no hydraulic actuators such as a bucket 30a, the controller 21 does not cause the control valve 40d to output hydraulic fluid from the hydraulic fluid outlet port 18a to the attachment 30 based on the control data read from the nonvolatile memory 22. The controller 21 may start control such as adjusting and/or limiting the travel speed and/or speed stage of the working vehicle 1 and/or the height of the raised/lowered booms 11 according to the selected attachment ID in step S18.

On the contrary, if the internal memory 21a stores no attachment IDs or RSSIs (NO in S13), the controller 21 determines whether or not the beacon scanner 23 has received any advertisement signals Q1 from beacon transmitter(s) 33. For example, assume that the beacon scanner 23 receives an advertisement signal Q1 within a third predetermined period of time T3 (NO in S20) from when the attaching switch 26 has been operated continuously for the first predetermined period of time T1 or more (S11) (YES in S19). In such a case, the controller 21 identifies the attachment 30 attached to the quick hitch 16 based on the attachment ID included in this advertisement signal Q1 (S21). Next, the controller 21 causes the nonvolatile memory 22 to store the result of identification of the attachment 30 as described earlier (S16), and starts a predetermined process according to the attachment ID included in the received advertisement signal Q1 (S17, S18).

For another example, in the case where the beacon scanner 23 receives a plurality of advertisement signals Q1 within the third predetermined period of time T3 (YES in S19), the controller 21 may determine at least one of whether the advertisement signals Q1 have an RSSI higher than a predetermined value X or whether the advertisement signals Q1 include vibration information indicating that the corresponding attachment 30 is vibrating. The controller 21 may, if the RSSI of any of the advertisement signals Q1 is higher than a predetermined value X and/or any of the advertisement signals Q1 includes vibration information indicating that the attachment 30 is vibrating, identify the attachment 30 attached to the quick hitch 16 based on the attachment ID included in that advertisement signal Q1 (S21). The controller 21 may cause the nonvolatile memory 22 to store the result of identification of the attachment 30 (S16) and start a predetermined process according to the attachment ID included in the advertisement signal Q1 (S17, S18).

If the beacon scanner 23 does not receive any advertisement signals Q1 within the third predetermined period of time T3 (NO in S19, YES in S20), the controller 21 causes the user interface 25 to display an attachment list L1 indicating attachment(s) 30 attachable to the quick hitch 16 (S22). Note that the third predetermined period of time T3 is, for example, about 10 seconds.

FIG. 9 shows an example of the attachment list L1. The data of the attachment list L1 is stored in the nonvolatile memory 22. The attachment list L1 displayed by the user interface 25 includes, for example, pieces of attachment information such as the names, the attachment IDs, and/or the specifications of the attachments 30 attachable to the quick hitch 16.

The operator selects a piece of attachment information relating to the attachment 30 attached to the quick hitch 16 from the attachment list using the user interface 25 (S23). Upon the selection, the controller 21 identifies the attachment 30 attached to the quick hitch 16 based on the selected piece of attachment information (S24). Then, the controller 21 causes the result of identification of the attachment 30 to be stored as described above (S16), and starts a predetermined process according to the selected piece of attachment information (S17, S18).

Also in the case where the manual selection mode is selected instead of the automatic selection mode (NO in S12) when the attaching switch 26 has been operated continuously for the first predetermined period of time T1 or more (S11), the controller 21 causes the user interface 25 to display the attachment list (S22). Next, upon selection of a piece of attachment information by the operator from the attachment list (S23), the controller 21 identifies the attachment 30 attached to the quick hitch 16 based on the selected piece of attachment information (S24). Next, the controller 21 causes the result of identification of the attachment 30 to be stored as describe earlier (S16), and starts a predetermined process according to the selected piece of attachment information (S17, S18).

The controller 21 may cause the user interface 25 to display icon(s) (symbol(s)) of the attachment(s) 30 attachable to the quick hitch 16 instead of the attachment list L1 of step S22, for example. In such a case, upon selection (designation) of any of the icons using the user interface 25 by the operator, the controller 21 reads the piece of attachment information of the attachment 30 corresponding to the selected icon from the nonvolatile memory 22, identifies the attachment 30 attached to the quick hitch 16 based on the piece of attachment information, and starts a predetermined process corresponding to the piece of attachment information (S17, S18).

Alternatively, the controller 21 may cause the user interface 25 to display an input screen for attachment information such as an attachment ID instead of the attachment list L1 of step S22. In such a case, upon input of a piece of attachment information of the attachment 30 attached to the quick hitch 16 by the operator via the input screen on the user interface 25, the controller 21 identifies the attachment 30 attached to the quick hitch 16 based on the inputted piece of attachment information and starts a predetermined process corresponding to the piece of attachment information (S17, S18).

The controller 21 may cause the user interface 25 to also display prompt information (such as a message) asking for selection or input of a piece of attachment information or an icon corresponding to the attachment 30 attached to the quick hitch 16, when causing the user interface 25 to display the foregoing attachment list L1, icons of the attachments 30, or the input screen for the attachment information.

When detaching the attachment 30 from the quick hitch 16, the operator operates the traveling device 5 and/or the working device 4 using the operation member(s) 6 and/or 7 to place the attachment 30 on the ground at a predetermined location. Next, if the operator operates the detaching switch 27 for the second predetermined period of time T2 or more, the controller 21 causes the latch cylinder 52 to retract. With this, the latch levers 57 pivot upward, the latch pins 54 are withdrawn from the through-holes 71*h* of the base plate 71 of the attachment 30 as illustrated in FIG. 21A, and the attachment 30 is unlatched from the latching mechanisms 51. That is, the attachment 30 is allowed to be detached from the quick hitch 16 and the working vehicle 1.

Figure 10:
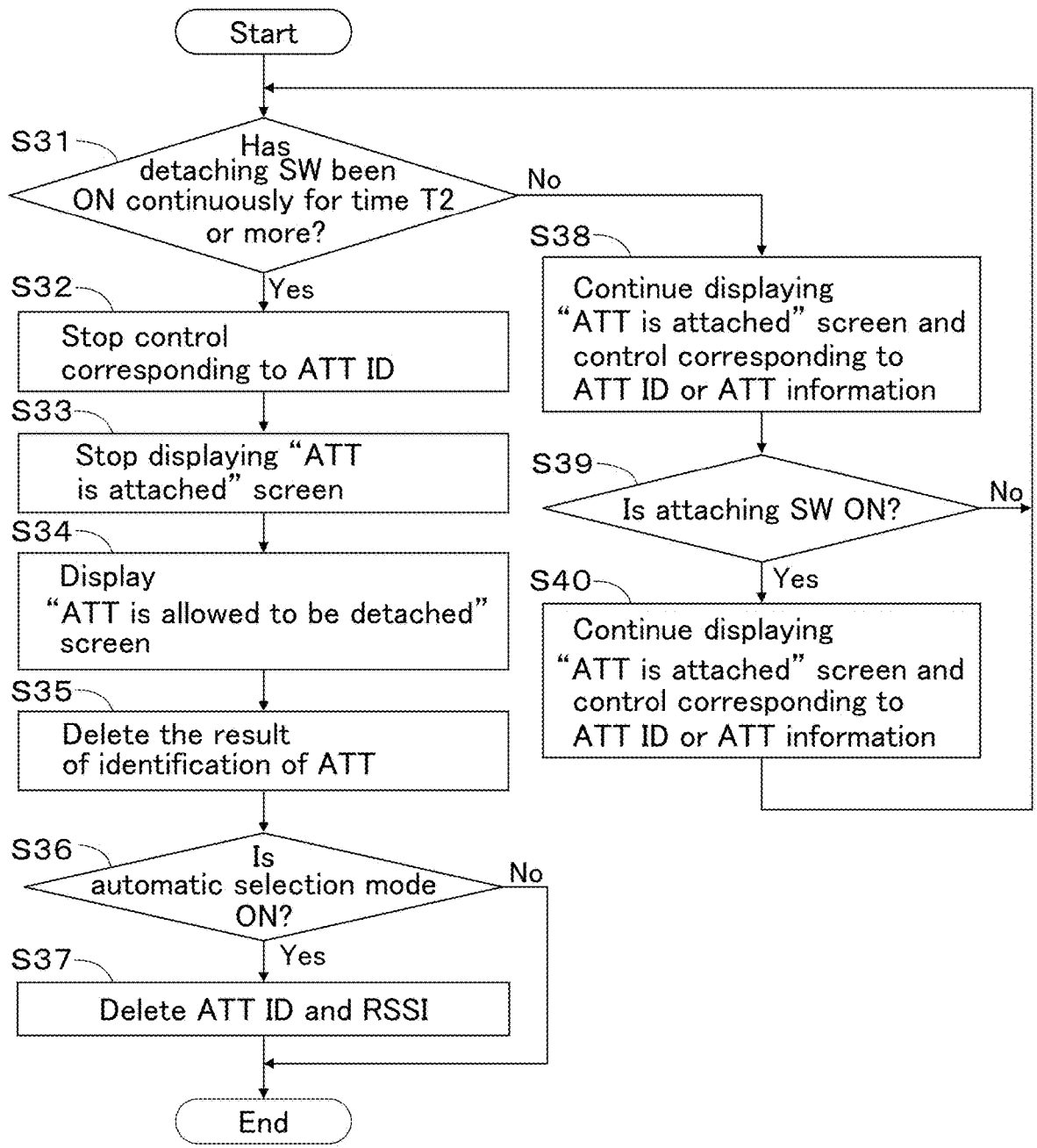
FIG. 10 is a flowchart showing an example of a release-of-attachment recognizing process.

FIG. 10 is a flowchart showing an example of the release-of-attachment recognizing process. If the detaching switch 27 is operated continuously (continues to be in ON state) for the second predetermined period of time T2 or more (S31) as described earlier, the controller 21 determines that the attachment 30 is allowed to be detached from the quick hitch 16. Next, the controller 21 stops the currently performed control corresponding to the attachment ID (S32). It is noted here that, if, for example, the control of the output of hydraulic fluid to the attachment 30 is currently being performed (the control was started in step S18 in FIG. 7), the controller 21 stops the control of the output. With this, the hydraulic fluid stops from being outputted from the working vehicle 1 to the attachment 30.

The controller 21 stops the display of the "attachment is attached" screen G1 shown in FIG. 8 (the display was started in step S17 in FIG. 7) (S33). That is, the controller 21 causes the user interface 25 to stop displaying the "attachment is attached" screen G1. Next, the controller 21 causes the user interface 25 to display (output) an "attachment is allowed to be detached" screen G2 including information indicating that the attachment 30 is allowed to be detached from the quick hitch 16 and the working vehicle 1 (S34).

Figure 11:
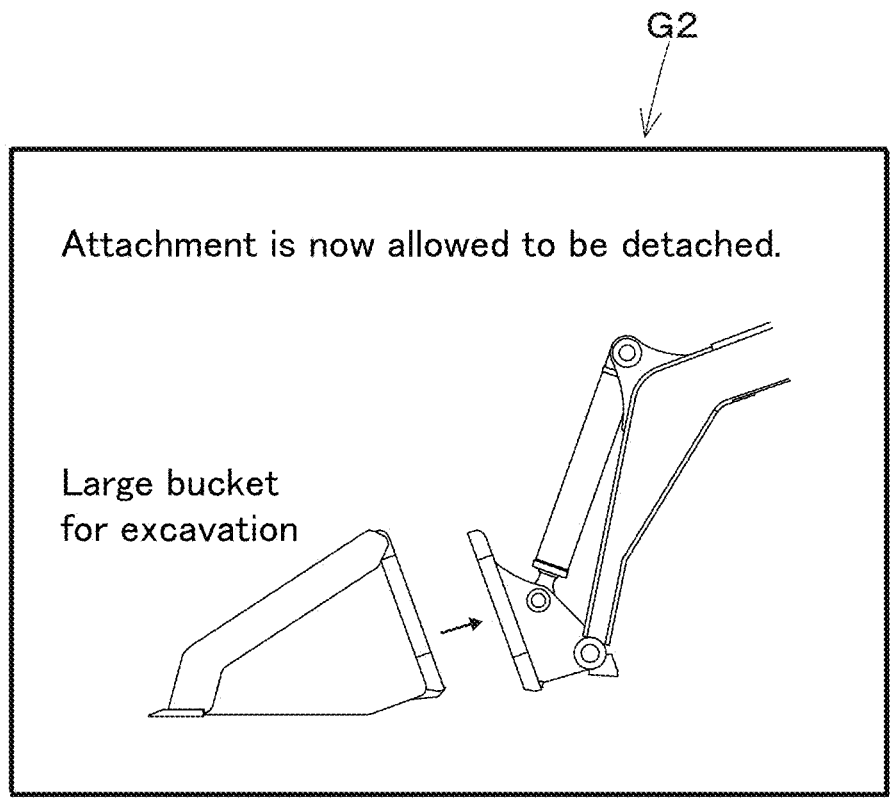
FIG. 11 illustrates an example of an "attachment is allowed to be detached" screen.

FIG. 11 illustrates an example of the "attachment is allowed to be detached" screen G2. The "attachment is allowed to be detached" screen G2 displays a message indicating that the attachment 30 is allowed to be detached, attachment information relating to the attachment 30 allowed to be detached (bucket 30*a* in the example in FIG. 11), and an icon of the attachment 30. The controller 21 may cause, for example, the "attachment is allowed to be detached" screen G2 to display a message indicating that the control (such as control of output of hydraulic fluid) corresponding to the attachment 30 has stopped. The controller 21 may cause the "attachment is allowed to be detached" screen G2 to be displayed for a period of time and then disappear.

For another example, the controller 21 may cause the communicator 24 to transmit, to a portable device 70, the display data for the "attachment is allowed to be detached" screen G2 and the attachment information relating to the detached attachment 30. The portable device 70 may receive the display data and the attachment information and cause a display to display the "attachment is allowed to be detached" screen G2.

The controller 21 deletes, from the nonvolatile memory 22, the result of identification of the attachment 30 allowed to be detached, after, for example, a fifth predetermined period of time T5 from when the "attachment is allowed to be detached" screen G2 started to be displayed (S35). Note that, for another example, the controller 21 may cause the nonvolatile memory 22 to store the result of identification of the detached attachment 30, as a history of use of the attachment 30 on the working vehicle 1. The controller 21 deletes the attachment ID and the RSSI stored in the internal memory 21*a* (S37) in the case where the automatic selection mode is selected (YES in S36).

On the contrary, if the detaching switch 27 is not operated continuously for the second predetermined period of time T2 or more with the attachment 30 attached to the quick hitch 16 (NO in S31), the controller 21 continues to cause the "attachment is attached" screen G1 to be displayed and continues to perform the control corresponding to the attachment ID selected in step S14 of the securing-of-attachment recognizing process (that is, the attachment ID of the attachment 30 attached to the quick hitch 16 (S38 in FIG. 10).

The controller 21 continues to cause the "attachment is attached" screen G1 to be displayed and continues to perform the control corresponding to the attachment ID selected in step S14 of the securing-of-attachment recognizing process, also when the attaching switch 26 is operated (YES in S39) (S40 in FIG. 10).

As has been described, the controller 21 selects the attachment ID of the attachment 30 attached to the quick hitch 16 and starts a predetermined process corresponding to the attachment ID (such as displaying the "attachment is attached" screen G1, controlling power output to the attachment 30, and/or the like). Even if the beacon scanner 23 receives advertisement signal(s) Q1 from beacon transmitter(s) 33 before the attachment 30 is allowed to be detached from the quick hitch 16, the controller 21 does not use the attachment(s) ID included in the advertisement signal(s) Q1 to identify the attachment 30 or start a predetermined process. In other words, the controller 21 does not perform the selection of an attachment ID or identification of an attachment 30 again, and continues to perform the process to display the attached attachment 30 and attachment information and/or perform the control corresponding to the selected attachment ID, until the identified attachment 30 is allowed to be detached from the quick hitch 16.

In the attachment information collecting process shown in FIG. 5, the controller 21 selects one of the advertisement signals Q1 received by the beacon scanner 23 that has an RSSI higher than first predetermined value X and that includes vibration information indicating that the attachment 30 is vibrating (YES in S4, YES in S6), and causes the internal memory 21a to store (collect) only the attachment(s) ID included in such advertisement signal(s) Q1 (S7). Note, however, that the controller 21 may, in the case where it is determined that the RSSI of the advertisement signal Q1 received by the beacon scanner 23 is higher than the first predetermined value X and/or that the advertisement signal Q1 includes vibration information indicating that the attachment 30 is vibrating, cause the internal memory 21a to store the attachment ID(s) included in such advertisement signal(s) Q1.

Figure 12:
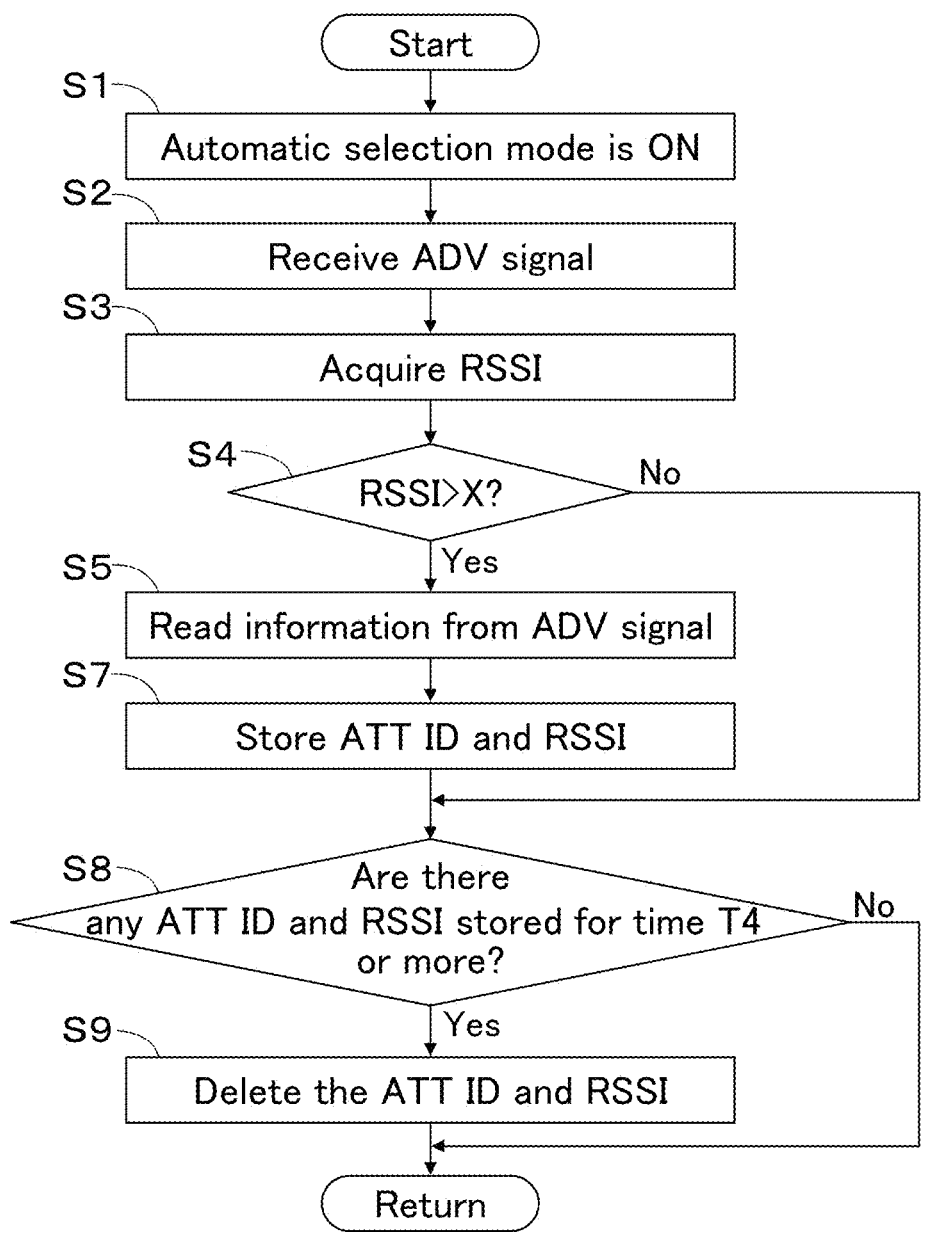
FIG. 12 is a flowchart showing another example of the attachment information collecting process.

Specifically, as shown in FIG. 12, the controller 21 may select one or more of the advertisement signal(s) Q1 received by the beacon scanner 23 that have an RSSI higher than the first predetermined value X (YES in S4) and cause the internal memory 21a to store only the attachment ID(s) included in the one or more advertisement signals Q1 (S5, S7).

Figure 13:
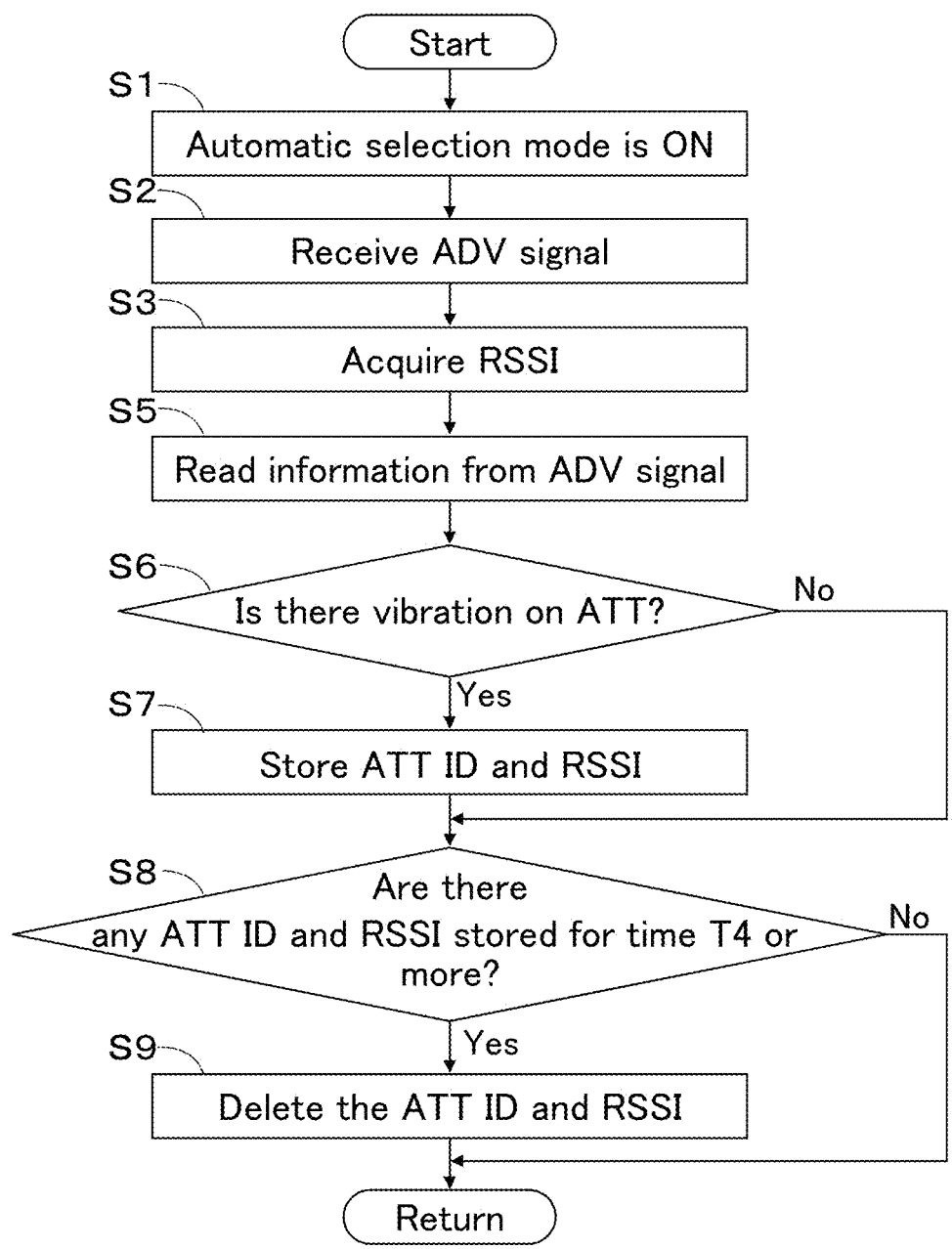
FIG. 13 is a flowchart showing a further example of the attachment information collecting process.

As shown in FIG. 13, the controller 21 may select one or more of the advertisement signal(s) Q1 received by the beacon scanner 23 that include vibration information indicating that the attachment 30 is vibrating (YES in S6) and cause the internal memory 21a to store the attachment ID(s) included in the one or more advertisement signals Q1 (S7). In the case where the attachment information collecting process is performed as shown in FIG. 13 or FIG. 12, the controller 21 may perform the securing-of-attachment recognizing process as discussed with reference to FIG. 7.

Figure 14:
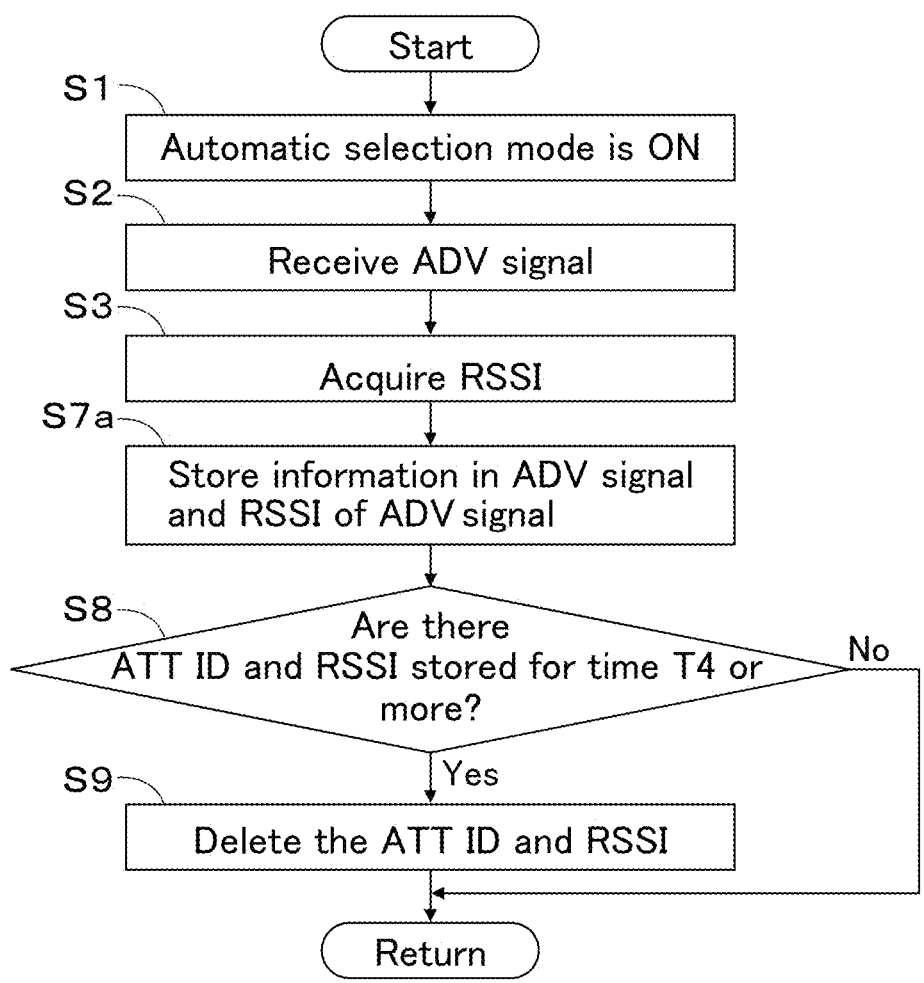
FIG. 14 is a flowchart showing still a further example of the attachment information collecting process.

For another example, the controller 21 may cause the internal memory 21a to store the attachment ID(s) included in all the advertisement signal(s) Q1 received by the beacon scanner 23 from the beacon transmitter(s) 33. Specifically, for example, as shown in FIG. 14, after the controller 21 receives advertisement signal(s) Q1 (S2) and acquires the RSSI(s) of the advertisement signal(s) Q1 (S3), the controller 21 causes the internal memory 21a to store information such as the attachment ID and vibration information included in each advertisement signal Q1 and the RSSI of the advertisement signal Q1 such that the information and the RSSI are associated with each other (S7a).

Figure 15:
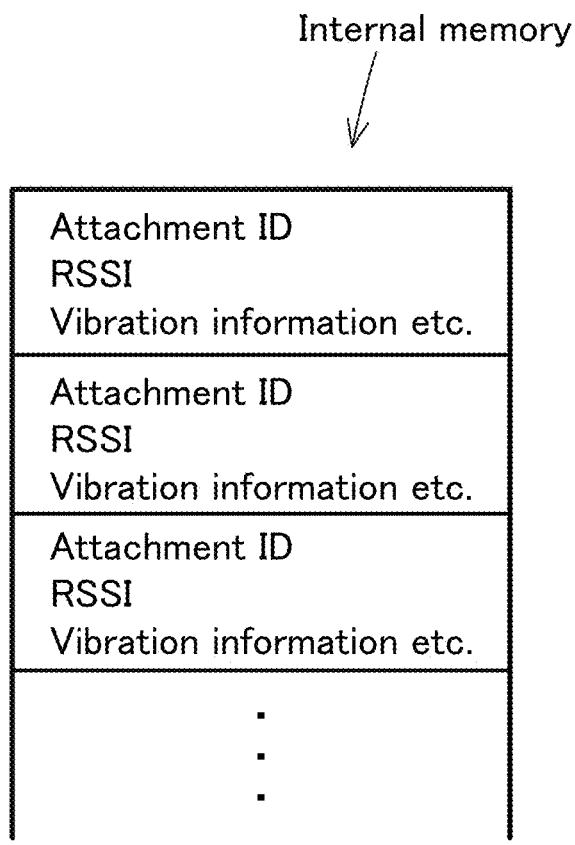
FIG. 15 is a diagram showing another example of information stored in the internal memory of the controller.

With this, as shown in FIG. 15, the attachment IDs and pieces of vibration information included in all the advertisement signals Q1 received by the beacon scanner 23 are collected in the internal memory 21a. In such a case, the controller 21 may perform the securing-of-attachment recognizing process as shown in FIGS. 16 to 18, for example.

Figure 16:
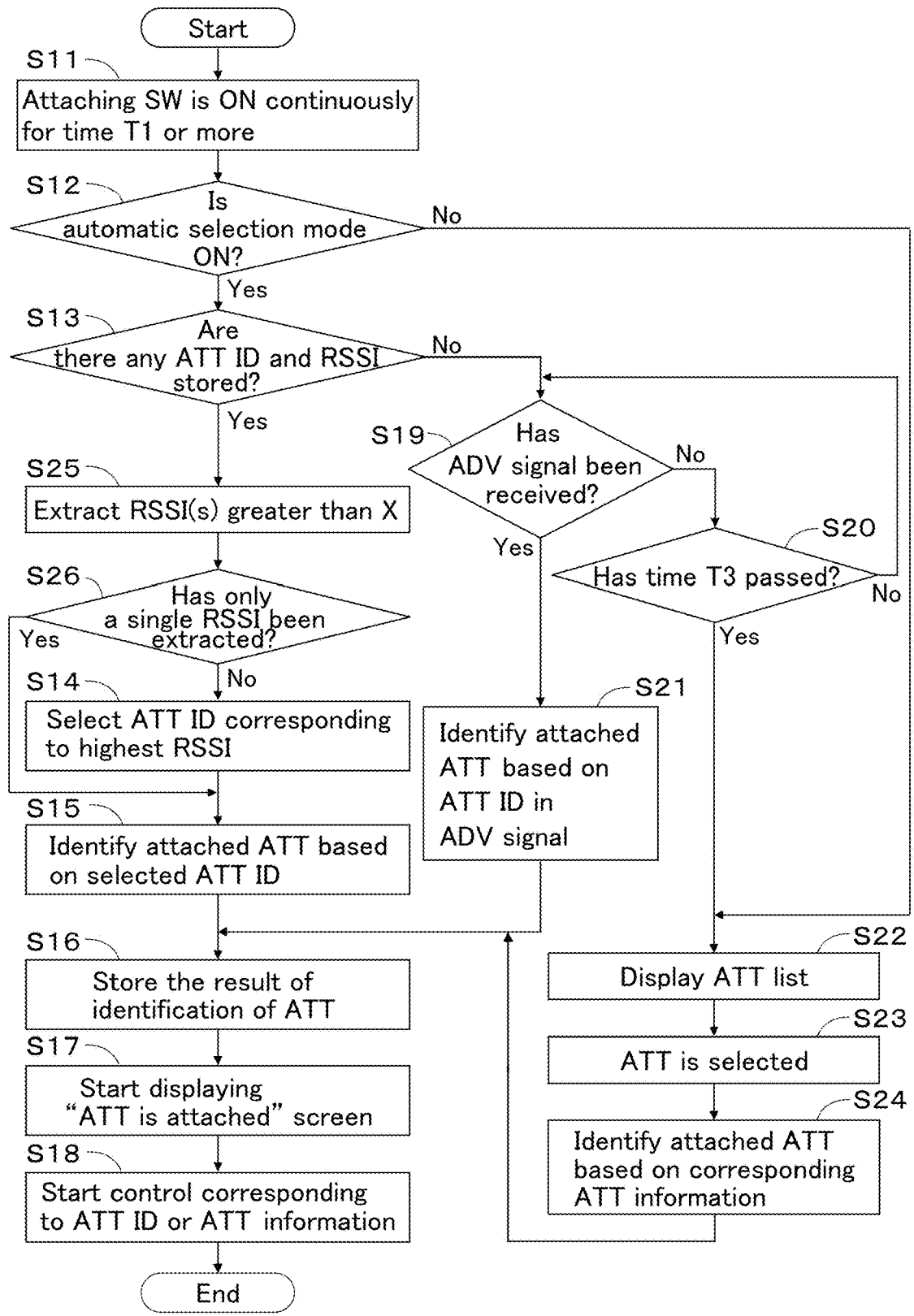
FIG. 16 is a flowchart showing another example of the securing-of-attachment recognizing process.

In FIG. 16, in the case where the internal memory 21a stores attachment ID(s) and RSSI(s) (YES in S13), the controller 21 extracts one or more of the RSSI(s) stored in the internal memory 21a that are higher than the first predetermined value X (S25). If a single RSSI is extracted (YES in S26), the controller 21 selects the attachment ID corresponding to that RSSI from the internal memory 21a and identifies the attachment 30 attached to the quick hitch 16 based on the attachment ID (S15).

In contrast, if two or more RSSIs are extracted (NO in S26), the controller 21 selects the attachment ID corresponding to the highest one of the extracted RSSIs (S14). The controller 21 then identifies the attachment 30 attached to the quick hitch 16 based on the selected attachment ID (S15).

Figure 17:
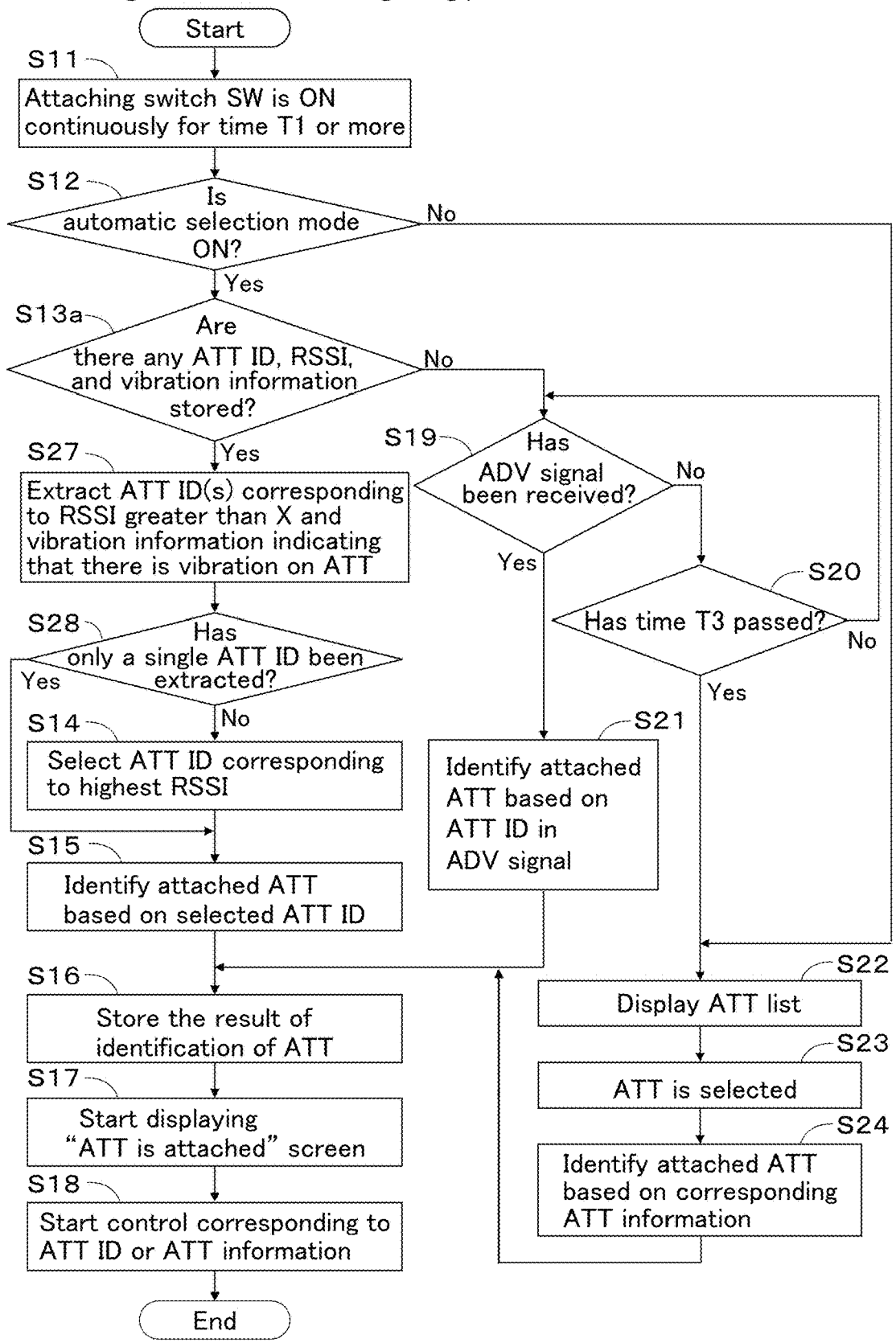
FIG. 17 is a flowchart showing a further example of the securing-of-attachment recognizing process.
Figure 18:
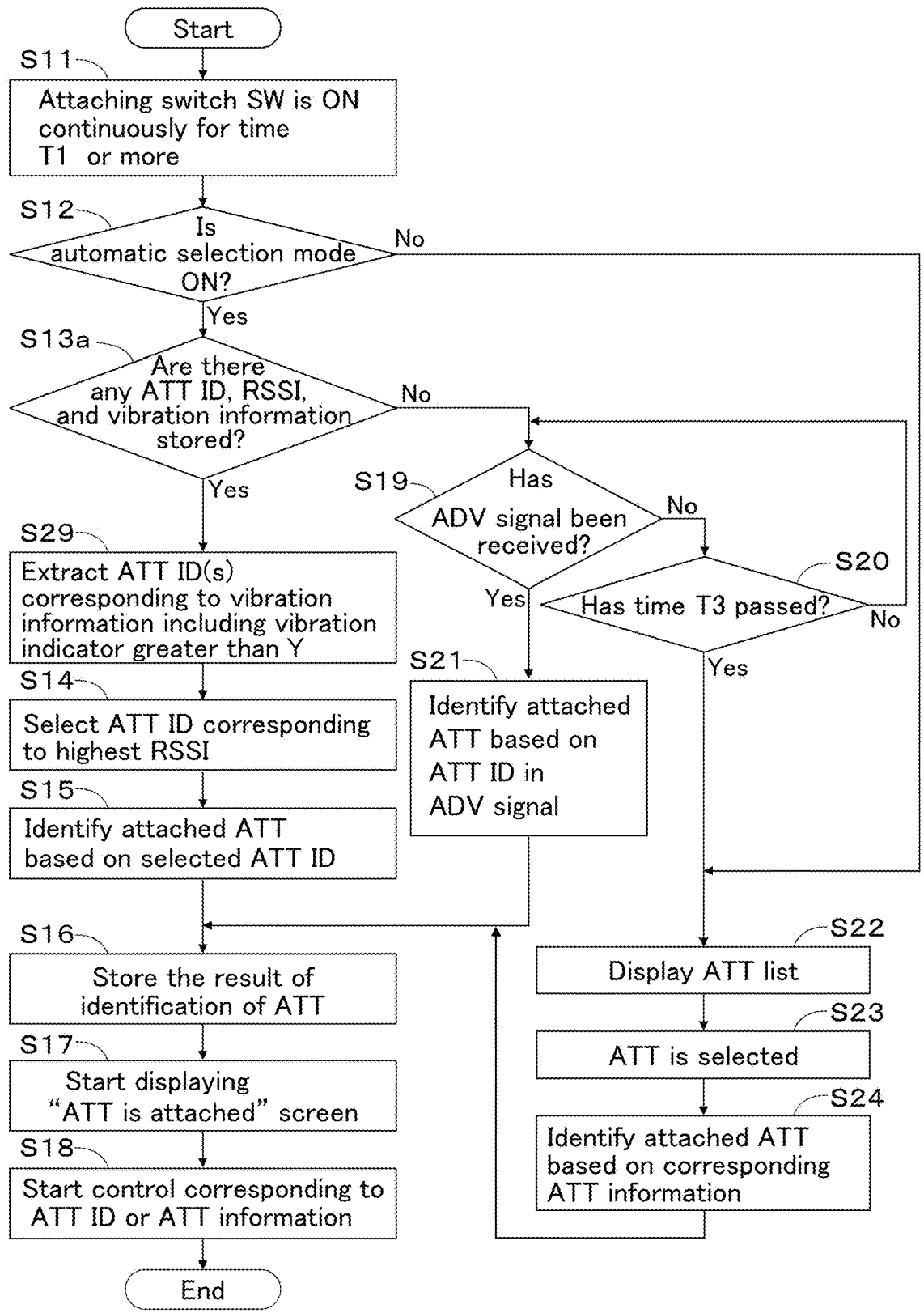
FIG. 18 is a flowchart showing still a further example of the securing-of-attachment recognizing process.

In FIG. 17, in the case where the internal memory 21a stores attachment ID(s), RSSI(s), and piece(s) of vibration information (YES in S13a), the controller 21 extracts one or more of the attachment ID(s) that correspond to RSSI(s) higher than the first predetermined value X and correspond to piece(s) of vibration information indicating that the corresponding attachment 30 is vibrating (S27). If a single attachment ID is extracted (YES in S28), the controller 21 identifies the attachment 30 attached to the quick hitch 16 based on that attachment ID (S15). That is, the controller 21 selects the extracted attachment ID as the attachment ID of the attachment 30 attached to the quick hitch 16.

On the contrary, if two or more attachment IDs are extracted (NO in S28), the controller 21 selects the attachment ID that corresponds to the highest one of the RSSIs higher than the first predetermined value X (S14). The controller 21 then identifies the attachment 30 attached to the quick hitch 16 based on the selected attachment ID (S15).

In FIG. 18, in the case where the internal memory 21a stores attachment ID(s), RSSI(s), and piece(s) of vibration information (YES in S13a), the controller 21 extracts one or more of the attachment ID(s) that include a vibration indicator greater than the second predetermined value Y (S29). Next, the controller 21 selects the attachment ID that corresponds to the highest one of the RSSI(s) corresponding to the extracted attachment ID(s) (S14). The controller 21 then identifies the attachment 30 attached to the quick hitch 16 based on the selected attachment ID (S15).

In the securing-of-attachment recognizing process in FIGS. 16 to 18, after the controller 21 performs step S15, the controller 21 causes the result of identification of the attachment 30 to be stored as described earlier (S16) and starts a predetermined process corresponding to the selected attachment ID (S17, S18). In the case where the internal memory 21a stores no attachment IDs (NO in S13) or in the case where the manual selection mode is selected (NO in S12), the controller 21 performs steps S19 to S24 as described earlier.

In preferred embodiments as shown in FIG. 7 and the like, the controller 21 selects the attachment ID that corresponds to the highest RSSI from pieces of information (such as attachment IDs and RSSIs) collected in the internal memory 21a. However, additionally or alternatively, for example, the controller 21 may select attachment ID(s) satisfying a predetermined condition relating to RSSI from pieces of information collected in the internal memory 21a, such as the attachment ID that corresponds to the RSSI closest to a predetermined strength threshold higher than the predetermined value X or the attachment ID that corresponds to the RSSI which has been determined as being equal to or higher than a predetermined strength threshold the predetermined number of times.

Alternatively, the controller 21 may select attachment ID(s) satisfying a predetermined condition relating to vibration information of the attachment 30 from pieces of information collected in the internal memory 21a, such as the attachment ID that corresponds to the vibration indicator closest to a predetermined vibration threshold or the attachment ID that corresponds to a vibration indicator which has been determined as being equal to or greater than the vibration threshold the predetermined number of times. Additionally or alternatively, the controller 21 may detect time series variations in RSSI or vibration information collected in the internal memory 21*a* and select attachment ID(s) which match a predetermined variation. That is, the controller 21 may select one or more of the attachment ID(s) collected in the internal memory 21*a* based on a predetermined condition relating to at least one of RSSI or vibration information.

In the above-described preferred embodiments, each attachment 30 is provided with a beacon transmitter 33 to transmit a wireless signal (advertisement signal Q1) compliant with Bluetooth (registered trademark) Low Energy, and the working vehicle 1 is provided with a beacon scanner 23 to receive the wireless signals. However, additionally or alternatively, for example, the attachment 30 may be provided with a transmitter such as a radio frequency identification (RFID) tag, and the working vehicle 1 may be provided with a receiver to receive wireless signals transmitted from the RFID. Additionally or alternatively, the attachment 30 may be provided with a transmitter to transmit radio waves for some other near field communication, and the working vehicle 1 may be provided with a receiver to receive the radio waves.

In the above-described preferred embodiments, the working vehicle 1 is provided with the quick hitch 16. Alternatively, the working vehicle 1 may be provided with a hitch having a different structure from the quick hitch 16, a quick hitch to which an attachment 30 can be attached and detached both automatically and manually, or a hitch to which an attachment 30 can be attached and detached only manually. In the case where the operator manually attaches the attachment 30 to the hitch or manually detaches the attachment 30 from the hitch, the operator may input information indicating that the attachment 30 is attached or detached using the user interface 25.

In the above-described preferred embodiments, the operator inputs attachment information relating to the attachment 30 attached to the quick hitch 16 using the user interface 25 provided in or on the working vehicle 1. However, for example, the operator may input attachment information relating to the attachment 30 attached to the quick hitch 16 using a portable device 70. That is, the portable device 70 may be used as a user interface instead of the user interface 25.

In such a case, upon input of attachment information into the portable device 70, the portable device 70 transmits the attachment information to the communicator 24 of the working vehicle 1 via the Internet and/or the like. Upon receipt of the attachment information by the communicator 24, the controller 21 of the working vehicle 1 recognizes the attachment 30 attached to the quick hitch 16 based on the attachment ID included in the attachment information.

In the above-described preferred embodiments, the working device 4, the quick hitch 16, and the specific attachment 30*b* are provided with hydraulic actuators (such as the boom cylinders 14, the front cylinders 15, and the latch cylinder 52). Additionally or alternatively, the working device 4, the quick hitch 16, and the specific attachment may be provided with electric actuators. In the case where an attachment including an electric actuator is attached to the quick hitch 16, the controller 21 may output, as power for the electric actuator, electricity (power) from the battery 20 (FIG. 1) to the attachment via an external electric wire based on control data corresponding to the attachment.

An attachment including a work member to be actuated by power from the prime mover 9 of the working vehicle 1 may be attached to the quick hitch 16. In the case where such an attachment including a work member is attached to the quick hitch 16, the controller 21 may output power from the prime mover 9 to the attachment via a power transmission mechanism including gear(s), shaft(s), and/or the like based on control data corresponding to the attachment.

A working vehicle 1 according to one or more preferred embodiments discussed above includes a hitch (quick hitch) 16 to attach and detach an attachment 30 thereto and therefrom, a receiver (beacon scanner) 23 to receive one or more wireless signals (advertisement signals) Q1 which are transmitted periodically from one or more transmitters (beacon transmitters) 33 in or on one or more of the attachments 30, which include respective one or more pieces of identification information (attachment IDs) of the one or more attachments 30, and which are compliant with a near field communication standard, and a controller 21. An attachment usage system 100 according to one or more preferred embodiments described above includes the hitch 16, the transmitter(s) 33, the receiver 23, and the controller 21.

The controller 21 is configured or programmed to cause a first memory (internal memory) 21*a* to store, for a period of time T4, the one or more pieces of identification information included in the one or more wireless signals Q1 received by the receiver 23. The controller 21 is configured or programmed to, when one of the one or more attachments 30 is attached to the hitch 16, select a piece of identification information of the attachment 30 attached to the hitch 16 from the one or more pieces of identification information stored in the first memory 21*a* and start a predetermined process according to the selected piece of identification information. The controller 21 is configured or programmed to, even if the receiver 23 receives one or more wireless signals Q1 from one or more transmitters 33 before the attachment 30 is allowed to be detached from the hitch 16, continue to perform the predetermined process without performing selection a piece of identification information again.

With the above configuration, the controller 21 causes the first memory 21*a* to store, upon receipt by the receiver 23 of each wireless signal Q1 transmitted from a transmitter 33 in a one-way manner, a piece of identification information that is included in the wireless signal Q1, and, upon attachment of the attachment 30 to the hitch 16, selects the piece of identification information of the attached attachment 30 from the first memory 21*a*. With this, the controller 21 does not need to perform complex signal processing upon receipt of each wireless signal Q1, making it possible to reduce processing load on the controller 21. Furthermore, even if the receiver 23 receives one or more wireless signals Q1 while the attachment 30 is attached to the hitch 16, the controller 21 continues to perform the predetermined process without performing selection of a piece of identification information again, making it possible to smoothly perform the predetermined process on the working vehicle 1. It follows that it is possible to efficiently use each of exchangeable attachments 30 on the working vehicle 1.

Furthermore, because pieces of identification information included in wireless signals Q1 that were received by the receiver 23 during a limited period of time (period of time T4) which ended when the attachment 30 was attached to the hitch 16 are collected (stored) in the first memory 21*a*, it is possible to prevent or reduce the likelihood that the working vehicle 1 will perform the predetermined process wrongly based on a piece of identification information included in a wireless signal Q1 received by the receiver 23 before the start of the limited period of time. It is also possible to reduce the capacity of the first memory 21*a* to store pieces of identification information, possible for the controller 21 to efficiently use the first memory 21*a* to store other information and data, and possible to use a memory which does not have a large capacity as the first memory 21a in the controller 21 to reduce cost.

In one or more preferred embodiments described above, the working vehicle 1 may further include a user interface 25 to output information indicating that the attachment 30 corresponding to the selected piece of identification information selected by the controller 21 is attached. With this, the operator of the working vehicle 1 can know that the attachment 30 is now attached to the hitch 16 and the working vehicle 1, and know what attachment 30 is attached.

In one or more preferred embodiments described above, the controller 21 may be configured or programmed to cause a portable device 70 (which is a user interface) to output information indicating that the attachment 30 corresponding to the selected piece of identification information is attached to the hitch 16 and the working vehicle 1. This makes it possible for the user (driver, operator, or the like) of the portable device 70 to know that the attachment 30 is now attached to the hitch 16 and the working vehicle 1 and know what attachment 30 is attached.

In one or more preferred embodiments described above, the working vehicle 1 may further include a second memory (volatile memory) 22 to store one or more pieces of control data corresponding to respective one or more pieces of identification information of one or more attachments 30 attachable to the hitch 16. The controller 21 may be configured or programmed to read, from the second memory 22, a piece of control data which is one of the one or more pieces of control data that corresponds to the selected piece of identification information, and start controlling power output to the attachment 30 attached to the hitch 16 based on the read piece of control data. This makes it possible for the operator of the working vehicle 1 to, after the attachment 30 is attached to the hitch 16, appropriately and immediately start work corresponding to the attachment 30.

In one or more preferred embodiments described above, the controller 21 may be configured or programmed to, if no identification information is stored in the first memory 21a when the attachment 30 is attached to the hitch 16, start the predetermined process according to a piece of identification information included in one or more wireless signals Q1 received by the receiver 23 within a predetermined period of time T3 from when the attachment 30 is attached to the hitch 16. With this, for example, even if no identification information is stored in the first memory 21a when the attachment 30 is attached to the hitch 16 due to an error, some other problem, and/or the like occurred during the attachment information collecting process as shown in FIG. 5 and the like, a piece of identification information included in a wireless signal Q1 received within the following period of time T3 is regarded as the piece of identification information of the attachment 30 attached to the hitch 16 and the predetermined process can be started appropriately.

In a preferred embodiment, the controller 21 may be configured or programmed to, upon determining that one or more of the one or more wireless signals Q1 received by the receiver 23 within the predetermined period of time T3 have a received signal strength greater than a first predetermined value X and/or that one or more of the one or more wireless signals Q1 include vibration information indicating that corresponding one or more of the one or more attachments 30 are vibrating, start the predetermined process according to a piece of identification information included in the one or more of the one or more wireless signals Q1. This makes it possible to determine that a piece of identification information included in a wireless signal Q1 received within the predetermined period of time T3 from when the attachment 30 is attached to the hitch 16 is the piece of identification information of the attachment 30 attached to the hitch 16, and more appropriately start the predetermined process.

In one or more preferred embodiments described above, the controller 21 may be configured or programmed to allow a user interface 25, 70 to receive a piece of attachment information relating to the attachment 30 attached to the hitch 16 if the receiver 23 does not receive any wireless signals Q1 from any transmitters 33 within the predetermined period of time T3, and start the predetermined process according to the piece of attachment information received via the user interface 25, 70. With this, in the case where no identification information is stored in the first memory 21a and the receiver 23 does not receive any wireless signals Q1 within the predetermined period of time T3 from when the attachment 30 is attached to the hitch 16, it is possible to manually start the predetermined process corresponding to the piece of attachment information inputted via the user interface 25, 70.

In a preferred embodiment, the controller 21 may be configured or programmed to cause the user interface 25, 70 to display an attachment list L1 including one or more pieces of attachment information relating to respective one or more attachments 30 attachable to the hitch 16 if the receiver 23 does not receive any wireless signals Q1 from any transmitters 33 within the predetermined period of time T3, and start the predetermined process according to one of the one or more pieces of attachment information selected from the attachment list L1 via the user interface 25, 70. This allows the operator or the like of the working vehicle 1 to easily select a piece of attachment information relating to the attachment 30 attached to the hitch 16 from the attachment list L1 using the user interface 25, 70, making it possible to appropriately perform the predetermined process on the working vehicle 1 according to the piece of attachment information.

In one or more preferred embodiments describe above, the working vehicle 1 may further include a first operation switch (attaching switch) 26 to be operated to attach each of the one or more attachments 30 to the hitch 16, and a second operation switch (detaching switch) 27 to be operated to allow each of the one or more attachments 30 to be detached from the hitch 16. The controller 21 may be configured or programmed to determine whether or not one of the one or more attachments 30 is attached to the hitch 16 based on an operation state of the first operation switch 26, and determine whether or not the one of the one or more attachments 30 is allowed to be detached from the hitch 16 based on an operation state of the second operation switch 27. With this, the controller 21 determines that the attachment 30 is attached to the hitch 16 or that the attachment 30 is allowed to be detached from the hitch 16 as intended by the operator who operates the first operation switch 26 or the second operation switch 27, and timely selects the piece of identification information of the attachment 30 attached to the hitch 16, making it possible to start and continue the predetermined process at appropriate times.

In one or more preferred embodiments described above, the controller 21 may be configured or programmed to, upon determining that one or more of the one or more wireless signals Q1 received by the receiver 23 have a received signal strength greater than a first predetermined value X and/or that one or more of the one or more wireless signals Q1 include vibration information indicating that corresponding one or more of the one or more attachments are vibrating, cause the first memory 21a to store, for the period of time T4, one or more of the one or more pieces of identification information that are included in the one or more of the one or more wireless signals Q1. With this, the piece of identification information included in the wireless signal Q1 transmitted from the transmitter 33 of the attachment 30 attached to the hitch 16 and located near the working vehicle 1 is reliably stored in the first memory 21a, whereas piece(s) of identification information included in wireless signal(s) Q1 transmitted from transmitter(s) 33 of attachment(s) 30 not attached to the hitch 16 and located at a distance from the working vehicle 1 are not stored in the first memory 21a. This prevents or reduces the likelihood that the predetermined process will be performed wrongly according to a piece of identification information included in a wireless signal Q1 transmitted from a transmitter 33 of an attachment 30 not attached to the hitch 16.

In a preferred embodiment, the controller 21 may be configured or programmed to, if one of the one or more wireless signals Q1 received by the receiver 23 includes a vibration indicator indicating a magnitude of vibration of a corresponding one of the one or more attachments 30 and the vibration indicator is greater than a second predetermined value Y, determine that the one of the one or more wireless signals Q1 received by the receiver 23 includes the vibration information indicating that the attachments 30 is vibrating. With this, the piece of identification information included in the wireless signal Q1 transmitted from the transmitter 33 of the attachment 30 which vibrated when attached to the hitch 16 is reliably stored in the first memory 21a, whereas piece(s) of identification information included in wireless signal(s) Q1 transmitted from transmitter(s) 33 of attachment(s) 30 not vibrated because not attached to the hitch 16 are not stored in the first memory 21a. This prevents or reduces the likelihood that pieces of identification information included in wireless signals Q1 transmitted from transmitters 33 of attachments 30 not attached to the hitch 16 will be collected uselessly in the first memory 21a. Furthermore, it is not necessary to provide a vibration sensor on the receiver 23, making the configuration of the receiver 23 simple, preventing or reducing the cost increase, and preventing or reducing the complexity of processing performed by the controller 21.

In one or more preferred embodiments described above, the controller 21 may be configured or programmed to cause the first memory 21a to store, for the period of time T4, at least one of (i) one or more received signal strengths of the one or more wireless signals Q1 received by the receiver 23 or (ii) one or more pieces of vibration information relating to one or more vibration states of the one or more attachments included in the one or more wireless signals Q1 such that the at least one of (i) the one or more received signal strengths or (ii) the one or more pieces of vibration information is associated with the one or more pieces of identification information included in the one or more wireless signals Q1, and upon attachment of the attachment 30 to the hitch 16, select the piece of identification information of the attachment 30 attached to the hitch 16 from the one or more pieces of identification information stored in the first memory 21a based on a predetermined condition relating to at least one of received signal strength or vibration information, and start the predetermined process according to the selected piece of identification information. With this, even if a plurality of attachments 30 are present in the vicinity of the working vehicle 1, the controller 21 can easily select the piece of identification information of the attachment 30 attached to the hitch 16 from the pieces of identification information stored in the first memory 21a based on RSSI or vibration information of attachment(s) 30, and appropriately start the predetermined process according to the selected piece of identification information.

In a preferred embodiment, the controller 21 may be configured or programmed to cause the first memory 21a to store, for the period of time T4, one or more received signal strengths of the one or more wireless signals Q1 received by the receiver 23 such that the one or more received signal strengths are associated with the one or more pieces of identification information included in the one or more wireless signals Q1, and the predetermined condition includes a condition that one of the one or more pieces of identification information that corresponds to a highest one of the one or more received signal strengths is to be selected. With this, even if a plurality of attachments 30 are present in the vicinity of the working vehicle 1 and at least one of the attachments 30 is in a stationary state in which, for example, it is allowed to stand without making any movement or action or even if at least one of the attachments 30 is in a dynamic state in which, for example, it is attached to another working vehicle or the like and moving, the controller 21 can reliably and easily select from the first memory 21a the piece of identification information included in the wireless signal Q1 transmitted from the transmitter 33 of the attachment 30 attached to the hitch 16 located closest to the receiver 23 and appropriately and immediately start the predetermined process according to the selected piece of identification information.

In one or more preferred embodiments described above, the working vehicle 1 may be selectively operable in an automatic selection mode in which the controller 21 selects the piece of identification information of the attachment 30 attached to the hitch 16 from the one or more pieces of identification information stored in the first memory 21a and starts the predetermined process according to the selected piece of identification information, or a manual selection mode in which the controller 21 starts the predetermined process according to information relating to the attachment 30 inputted via a user interface 25, 70. This makes it possible to freely select either using the attachment 30 attached to the working vehicle 1 by automatically identifying the attachment 30 or using the attachment 30 by manually identifying the attachment 30, according to the preference of the operator of the working vehicle 1 or the like. Furthermore, regardless of whether the automatic selection mode or the manual selection mode is set by the operator or the like on the working vehicle 1, the controller 21 can identify the attachment 30 attached to the hitch 16 automatically or in response to manual operation and appropriately perform the predetermined process according to the piece of identification information of the attachment 30.

In one or more preferred embodiments described above, the controller 21 may be configured or programmed to cause the user interface 25, 70 to display an attachment list L1 including one or more pieces of attachment information relating to respective one or more attachments 30 attachable to the hitch 16 upon the working vehicle entering the manual selection mode and the attachment 30 being attached to the hitch, and start the predetermined process according to one of the one or more pieces of attachment information selected from the attachment list L1 via the user interface 25, 70. With this, when the working vehicle 1 is in the manual selection mode, the operator of the working vehicle 1 or the like can easily select the piece of attachment information relating to the attachment 30 attached to the hitch 16 from the attachment list L1 using the user interface 25, 70, making it possible to appropriately perform the predetermined process at the working vehicle 1 according to the piece of attachment information.

In one or more preferred embodiments, the one or more transmitters 33 may include one or more beacon transmitters to transmit one or more advertisement signals Q1 including the one or more pieces of identification information of the one or more attachments 30 in or on which the one or more transmitters 33 are provided. The receiver 23 may include a beacon scanner to receive the one or more advertisement signals Q1. With this, one-way communication from versatile beacon transmitter(s) 33 to the beacon scanner makes it possible to easily select the piece of identification information of the attachment 30 attached to the hitch 16 of the working vehicle 1 and immediately start the predetermined process according to the selected piece of identification information.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:
    a hitch to attach and detach an attachment thereto and therefrom;
    a receiver to receive one or more wireless signals which are transmitted periodically from one or more transmitters in or on one or more of the attachments, which include respective one or more pieces of identification information of the one or more attachments, and which are compliant with a near field communication standard; and
    a controller; wherein
    the controller is configured or programmed to:
        cause a first memory to store, for a period of time, the one or more pieces of identification information included in the one or more wireless signals received by the receiver;
        when one of the one or more attachments is attached to the hitch, select a piece of identification information of the attachment attached to the hitch from the one or more pieces of identification information stored in the first memory and start a predetermined process according to the selected piece of identification information; and
        even if the receiver receives one or more wireless signals from one or more transmitters before the attachment is allowed to be detached from the hitch, continue to perform the predetermined process without performing selection of a piece of identification information again.

2. The working vehicle according to claim 1, further comprising a user interface to output information indicating that the attachment corresponding to the selected piece of identification information selected by the controller is attached.

3. The working vehicle according to claim 1, further comprising:
    a second memory to store one or more pieces of control data corresponding to respective one or more pieces of identification information of one or more attachments attachable to the hitch; wherein
    the controller is configured or programmed to:
        read, from the second memory, a piece of control data which is one of the one or more pieces of control data that corresponds to the selected piece of identification information; and
        start controlling power output to the attachment attached to the hitch based on the read piece of control data.

4. The working vehicle according to claim 1, wherein
    the controller is configured or programmed to, if no identification information is stored in the first memory when the attachment is attached to the hitch, start the predetermined process according to a piece of identification information included in one or more wireless signals received by the receiver within a predetermined period of time from when the attachment is attached to the hitch.

5. The working vehicle according to claim 4, wherein
    the controller is configured or programmed to, upon determining that one or more of the one or more wireless signals received by the receiver within the predetermined period of time have a received signal strength greater than a first predetermined value and/or that one or more of the one or more wireless signals include vibration information indicating that corresponding one or more of the one or more attachments are vibrating, start the predetermined process according to a piece of identification information included in the one or more of the one or more wireless signals.

6. The working vehicle according to claim 4, wherein
    the controller is configured or programmed to:
        allow a user interface to receive a piece of attachment information relating to the attachment attached to the hitch if the receiver does not receive any wireless signals from any transmitters within the predetermined period of time; and
        start the predetermined process according to the piece of attachment information received via the user interface.

7. The working vehicle according to claim 6, wherein
    the controller is configured or programmed to:
        cause the user interface to display an attachment list including one or more pieces of attachment information relating to respective one or more attachments attachable to the hitch if the receiver does not receive any wireless signals from any transmitters within the predetermined period of time; and
        start the predetermined process according to one of the one or more pieces of attachment information selected from the attachment list via the user interface.

8. The working vehicle according to claim 1, further comprising:
    a first operation switch to be operated to attach each of the one or more attachments to the hitch; and
    a second operation switch to be operated to allow each of the one or more attachments to be detached from the hitch; wherein
    the controller is configured or programmed to:
        determine whether or not one of the one or more attachments is attached to the hitch based on an operation state of the first operation switch; and
        determine whether or not the one of the one or more attachments is allowed to be detached from the hitch based on an operation state of the second operation switch.

9. The working vehicle according to claim 1, wherein
the controller is configured or programmed to, upon determining that one or more of the one or more wireless signals received by the receiver have a received signal strength greater than a first predetermined value and/or that one or more of the one or more wireless signals include vibration information indicating that corresponding one or more of the one or more attachments are vibrating, cause the first memory to store, for the period of time, one or more of the one or more pieces of identification information that are included in the one or more of the one or more wireless signals.

10. The working vehicle according to claim 9, wherein
the controller is configured or programmed to, if one of the one or more wireless signals received by the receiver includes a vibration indicator indicating a magnitude of vibration of a corresponding one of the one or more attachments and the vibration indicator is greater than a second predetermined value, determine that the one of the one or more wireless signals received by the receiver includes the vibration information.

11. The working vehicle according to claim 1, wherein
the controller is configured or programmed to:
cause the first memory to store, for the period of time, at least one of (i) one or more received signal strengths of the one or more wireless signals received by the receiver or (ii) one or more pieces of vibration information relating to one or more vibration states of the one or more attachments included in the one or more wireless signals such that the at least one of (i) the one or more received signal strengths or (ii) the one or more pieces of vibration information is associated with the one or more pieces of identification information included in the one or more wireless signals; and
upon attachment of the attachment to the hitch, select the piece of identification information of the attachment attached to the hitch from the one or more pieces of identification information stored in the first memory based on a predetermined condition relating to at least one of received signal strength or vibration information, and start the predetermined process according to the selected piece of identification information.

12. The working vehicle according to claim 11, wherein
the controller is configured or programmed to cause the first memory to store, for the period of time, one or more received signal strengths of the one or more wireless signals received by the receiver such that the one or more received signal strengths are associated with the one or more pieces of identification information included in the one or more wireless signals; and
the predetermined condition includes a condition that one of the one or more pieces of identification information that corresponds to a highest one of the one or more received signal strengths is to be selected.

13. The working vehicle according to claim 1, wherein the working vehicle is selectively operable in:
an automatic selection mode in which the controller selects the piece of identification information of the attachment attached to the hitch from the one or more pieces of identification information stored in the first memory and starts the predetermined process according to the selected piece of identification information; or
a manual selection mode in which the controller starts the predetermined process according to information relating to the attachment inputted via a user interface.

14. The working vehicle according to claim 13, wherein
the controller is configured or programmed to:
cause the user interface to display an attachment list including one or more pieces of attachment information relating to respective one or more attachments attachable to the hitch upon the working vehicle entering the manual selection mode and the attachment being attached to the hitch; and
start the predetermined process according to one of the one or more pieces of attachment information selected from the attachment list via the user interface.

15. The working vehicle according to claim 1, wherein
the one or more transmitters include one or more beacon transmitters to transmit one or more advertisement signals including the one or more pieces of identification information of the one or more attachments in or on which the one or more transmitters are provided; and
the receiver includes a beacon scanner to receive the one or more advertisement signals.

16. An attachment usage system comprising:
a hitch to attach and detach an attachment thereto and therefrom, the hitch being provided on a working vehicle;
one or more transmitters to periodically transmit one or more wireless signals which include respective one or more pieces of identification information of one or more of the attachments and which are compliant with a near field communication standard, the one or more transmitters being provided in or on the one or more attachments;
a receiver to receive the one or more wireless signals which are transmitted from the one or more transmitters, the receiver being provided in or on the working vehicle; and
a controller; wherein
the controller is configured or programmed to:
cause a first memory to store, for a period of time, the one or more pieces of identification information included in the one or more wireless signals received by the receiver;
when one of the one or more attachments is attached to the hitch, select a piece of identification information of the attachment attached to the hitch from the one or more pieces of identification information stored in the first memory and start a predetermined process according to the selected piece of identification information; and
even if the receiver receives one or more wireless signals from one or more transmitters before the attachment is allowed to be detached from the hitch, continue to perform the predetermined process without performing selection of a piece of identification information again.

17. The attachment usage system according to claim 16, wherein the controller is configured or programmed to cause a user interface to output information indicating that the attachment corresponding to the selected piece of identification information is attached.

18. The attachment usage system according to claim 16, wherein
the controller is configured or programmed to, if no identification information is stored in the first memory when the attachment is attached to the hitch, start the predetermined process according to a piece of identification information included in one or more wireless signals received by the receiver within a predetermined period of time from when the attachment is attached to the hitch.

19. The attachment usage system according to claim 16, further comprising:

a first operation switch to be operated to attach each of the one or more attachments to the hitch; and a second operation switch to be operated to allow each of the one or more attachments to be detached from the hitch; wherein the controller is configured or programmed to:

determine whether or not one of the one or more attachments is attached to the hitch based on an operation state of the first operation switch; and determine whether or not the one of the one or more attachments is allowed to be detached from the hitch based on an operation state of the second operation switch.

20. The attachment usage system according to claim 16, wherein the controller is configured or programmed to, upon determining that one or more of the one or more wireless signals received by the receiver have a received signal strength greater than a first predetermined value and/or that one or more of the one or more wireless signals include vibration information indicating that corresponding one or more of the one or more attachments are vibrating, cause the first memory to store, for the period of time, one or more of the one or more pieces of identification information that are included in the one or more of the one or more wireless signals.

* * * * *